(12) United States Patent
Sugita et al.

(10) Patent No.: US 8,016,445 B2
(45) Date of Patent: Sep. 13, 2011

(54) PLANAR LIGHT EMITTING ELEMENT, IMAGE DISPLAY ELEMENT, AND IMAGE DISPLAY DEVICE USING THE SAME

(75) Inventors: Tatsuya Sugita, Takahagi (JP); Masaya Adachi, Hitachi (JP); Shinichi Komura, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 187 days.

(21) Appl. No.: 12/192,192

(22) Filed: Aug. 15, 2008

(65) Prior Publication Data

US 2009/0086466 A1  Apr. 2, 2009

(30) Foreign Application Priority Data

Sep. 27, 2007 (JP) .................................. 2007-250394

(51) Int. Cl.
*G09F 13/04* (2006.01)
(52) U.S. Cl. ...... 362/97.1; 362/97.3; 362/607; 362/616; 362/331
(58) Field of Classification Search .......... 362/607–610, 362/616, 97.1–97.3, 618, 620, 626
See application file for complete search history.

(56) References Cited

U.S. PATENT DOCUMENTS

| 7,119,957 | B2* | 10/2006 | Itoh et al. | 359/495 |
|---|---|---|---|---|
| 7,374,328 | B2* | 5/2008 | Kuroda et al. | 362/620 |
| 7,527,410 | B2* | 5/2009 | Yoshizawa et al. | 362/615 |
| 7,726,865 | B2* | 6/2010 | Sato et al. | 362/620 |
| 2001/0053074 | A1* | 12/2001 | Onishi et al. | 362/31 |
| 2002/0080598 | A1* | 6/2002 | Parker et al. | 362/31 |
| 2004/0022050 | A1 | 2/2004 | Yamashita et al. | |
| 2007/0002233 | A1* | 1/2007 | Yano et al. | 349/117 |
| 2007/0025121 | A1* | 2/2007 | Harada et al. | 362/607 |

FOREIGN PATENT DOCUMENTS

| JP | 08-221013 | 8/1996 |
|---|---|---|
| JP | 09-113730 | 5/1997 |

(Continued)

OTHER PUBLICATIONS

Machine Translation of Sato WO 2007/020820.*
Chien et al., "Polarized backlight based on selectives total internal reflection at microgrooves", Applied Optics, vol. 43, No. 24, Aug. 2004.

*Primary Examiner* — Evan Dzierzynski
(74) *Attorney, Agent, or Firm* — Antonelli, Terry, Stout & Kraus, LLP.

(57) ABSTRACT

A planar light emitting element is capable of outputting light having high directivity in at least one direction. The planar light emitting element has a light guide plate and first and second low refractive index layers. Light incident on the light guide plate is totally reflected on the interface between the light guide plate and the second low refractive index layer, propagates in the light guide plate, and is output from the light guide plate to the first low refractive index layer through a light output opening section. When a refractive index of the first low refractive index layer is sufficiently smaller than a refractive index of the light guide plate, the light propagates in the light guide plate at a large angle with respect to a light output surface of the light guide plate. When the difference between the refractive indexes of the first and second low refractive index layers is small, a spreading angle of light output to the first low refractive index layer is small. The light having high directivity is reflected on a reflective mirror and output from the planar light emitting element.

31 Claims, 21 Drawing Sheets

FOREIGN PATENT DOCUMENTS

| | | |
|---|---|---|
| JP | 2001-312915 | 11/2001 |
| JP | 2002-222604 | 8/2002 |
| JP | 2005-062741 | 3/2005 |
| JP | 2005-268201 | 9/2005 |

* cited by examiner

PLANAR LIGHT EMITTING ELEMENT, IMAGE DISPLAY ELEMENT, AND IMAGE DISPLAY DEVICE USING THE SAME

BACKGROUND OF THE INVENTION

1. Field of the Invention

The present invention relates to a planar light emitting element such as a backlight to be used in a liquid crystal display device or the like, an image display element, and an image display device using the planar light emitting device and the image display element.

2. Description of the Related Art

JP-A-2005-62741 (Patent Document 1) discloses a display device having an illumination device, a plurality of picture elements, and a plurality of light focusing elements. The illumination device is adapted to emit light toward the light focusing elements from a front side thereof. The picture elements are juxtaposed to each other. Each of the picture elements has a transmission region for transmitting light incident on the picture element from the illumination device. The light focusing elements are provided for the respective transmission regions and on the front side of the illumination device. Spots of light fluxes transmitted through the respective light focusing elements are formed on a plane defined by the respective picture elements and in the respective transmission regions of the picture elements to ensure that the centers of the spots are located in the respective transmission regions. The position (in a column direction) of the center of a light spot formed on one of the picture elements is different from the position (in a column direction) of the center of a light spot formed on a picture element adjacent to the one of the picture elements in a row direction.

JP-A-2005-268201 (Patent Document 2) discloses a planar light source device having a light guide plate and a concave deflection pattern formed on a lower surface of the light guide plate. The concave deflection pattern includes a light reflection portion, a flat portion and a directivity change portion. The light reflection portion faces the side of a light source and inclined with respect to the flat portion. The directivity change portion is located between the light reflection portion and the flat portion and adapted to increase the directivity of light to be incident on the light reflection portion. The planar light source device is capable of improving the directivity of light output from the light guide plate.

JP-A-H08-221013 (Patent Document 3) discloses a backlight device having a first light guide plate, a line light source and a second light guide plate. The first light guide plate has a refractive index $n_1$. The surface of the first light guide plate is parallel to the surface of a liquid crystal panel. The line light source is provided on a side surface of the first light guide plate. The second light guide plate is provided on the first light guide plate and on the side of the liquid crystal panel with respect to the first light guide plate. The second light guide plate has a refractive index substantially equal to the refractive index $n_1$. The second light guide plate has a collimation pattern formed on its surface facing the surface of the first light guide plate. The collimation pattern is formed to direct, toward the liquid crystal panel, light emitted by the line light source and repeatedly totally reflected.

JP-A-2001-312915 (Patent Document 4) discloses a planar light emitting element having a light source, a light guide member and an output light control plate. Light emitted by the light source is incident on both side surfaces (facing each other) of the light guide member. The output light control plate is provided above a light output surface of the light guide member. The output light control plate has a plurality of protrusions formed on a surface thereof facing the light output surface of the light guide member. The protrusions of the output light control plate are adapted to direct light output from the light output surface of the light guide member toward a direction substantially parallel to a normal to the light output surface of the light guide member. At least one optically transparent layer is provided between the light guide member and the output light control plate. Tip portions of the protrusions of the output light control plate are in contact with the at least one optically transparent layer. The protrusions of the output light control plate have respective refractive indexes higher than a refractive index of the light guide member. The at least one optically transparent layer has a refractive index higher than that of the light guide member.

JP-A-H09-113730 (Patent Document 5) discloses a planar light source device having a light guide plate and a linear light source provided on an incident surface of the light guide plate. The light guide plate has a light focusing pattern formed on a surface thereof and a deflection pattern formed on another surface thereof facing the surface on which the light focusing pattern is formed. The light focusing pattern has a relatively large average inclination angle (an average inclination angle is defined in Patent Document 5). The deflection pattern has a relatively small average inclination angle. Light emitted by the linear light source is repeatedly reflected within the light guide plate and output in a direction inclined at a small elevation angle with respect to a light output surface of the light guide plate and substantially parallel to the light output surface of the light guide plate. The output light is focused by the light focusing pattern and directed to a single direction. The planar light source device therefore has high directivity.

Non-Patent Document 1 (Applied Optics, Vol. 43, No. 24, pp. 4672-4676, 2004) discloses a planar light source in which output light has a polarization property by use of a material having a refractive index anisotropy.

SUMMARY OF THE INVENTION

Patent Document 1 describes that light output from the illumination device needs to have high directivity in order to allow the light focusing elements to effectively acts. In Patent Document 1, a structure similar to the planar light source device shown in Patent Document 2 is described as an example of the illumination device.

In Patent Document 1, the illumination device has high directivity in the direction of the tangent to a circular arc centered at the center of a light emitting diode of the light source and has low directivity in the direction parallel to a normal to a plane including the circular arc. The illumination device therefore exhibits the high directivity in the direction which is varied depending on the location. Patent Document 1 describes the illumination device which outputs light with substantially constant luminance levels across its light output surface and allows the light focusing elements to effectively focus the light, by using a spherical lens array as the light focusing elements, even under the condition that the illumination device exhibits the high directivity in the direction which is varied depending on the location. If the illumination device exhibits the high directivity in the direction which is varied under the condition that the distribution of the directivity is not varied, it is expected that the light focusing elements can focus light output from the illumination device and having substantially constant luminance levels across the light output surface of the illumination device by using the spherical lens array as the light focusing elements.

It is, however, necessary that the illumination device have high directivity in all directions in order to maximize functions of the light focusing elements when the spherical lens array is used as the light focusing elements. In the technique described in Patent Document 1, the light focusing elements cannot sufficiently exert the functions since the illumination device exhibits high directivity in a single direction at a single location and the direction of the high directivity is varied.

Each of Patent Documents 2 to 4 discloses a technique for a planar light source capable of improving directivity of an illumination device. Each of the planar light sources does not have a sufficient property in combination of a lens array. In Patent Document 2, the illumination device has directivity in a direction which is varied depending on the location similarly to the above description. Patent Document 3 describes that the second light guide plate allows directivity of light to be improved. Patent Document 4 describes that the output light control plate allows directivity of light to be improved. Based on the techniques described in Patent Documents 3 and 4, sufficient directivity of light cannot be obtained by using a light focusing element such as a lens array.

Patent Document 5 describes that a light focusing element is applied to the planar light source device having high directivity to obtain effective transmittance. In Patent Document 5, however, the light focusing pattern formed on one surface of the light guide plate is adapted to focus light having high directivity in a direction different from that of high directivity achieved by the planar light source device. The planar light source device cannot improve the high directivity which is important to the light focusing element, compared with a conventional planar light emitting element.

Non-Patent Document 1 describes the planar light source capable of obtaining polarized light by means of laminated members having respective different refractive indexes in addition to a structure similar to the planar light source device described in Patent Document 2. The planar light source described in Non-Patent Document 1, however, is not designed in consideration of directivity of output light and does not exhibit higher directivity of output light than that of output light described in Patent Document 2.

As described above, conventional planar light source devices cannot achieve sufficient directivity, i.e., sufficient collimation for using a light emitting element, that is, a lens array.

When a collimated light source and a lens array are used, the following two characteristics conflict with each other: a viewing angle; and a luminance level (front luminance level) of light output in a front direction. That is, when the viewing angle is increased, the front luminance level is reduced. On the other hand, when the front luminance level is increased, the viewing angle is reduced.

It is, therefore, an object of the present invention to provide a planar light emitting element, an image display element and an image display device using the planar light emitting element and the image display element. The planar light emitting element is capable of outputting light substantially collimated or spread at a small angle in at least one direction parallel to an axis of orthogonal coordinates in a plane.

To accomplish the object, a planar light emitting element according to an aspect of the present invention includes first and second refractive index layers and a reflective plate. The first and second refractive index layers are laminated on the side of a light output surface of a light guide body for transmitting light emitted by a light source. Light is output from the light output surface of the light guide body. An opening section is provided in the second refractive index layer provided between the first refractive index layer and the light guide body. The reflective plate is adapted to reflect light output from the light guide body through the opening section provided in the second refractive index layer. When refractive indexes of the light guide body, the first and second refractive index layers are $n_1$, $n_2$ and $n_3$, respectively, the following expressions are established: $n_1 > n_2 > n_3$; and $n_1 - n_2 > n_2 - n_3$.

A planar light emitting element according to another aspect of the present invention includes a refractive index layer, an inclined section, a reflective plate and a reflective film. The refractive index layer is provided on the side of a light output surface of a light guide body for transmitting light emitted by a light source. Light is output from the light output surface of the light guide body. The inclined section has an inclined groove formed at the interface between the light guide body and the refractive index layer. The reflective plate is provided at the interface between the light guide body and the refractive index layer and adapted to reflect light output from the light guide body and transmitted through the inclined section. The reflective film is provided on a surface of the reflective plate.

A planar light emitting element according to still another aspect of the present invention includes a refractive index layer and a reflective member. The refractive index layer is provided on the side of a light output surface of a light guide body for transmitting light emitted by a light source. Light is output from the light output surface of the light guide body. The reflective member is provided on the side of a light output surface of the refractive index layer and has a reflective surface for reflecting light output from the light guide body through the refractive index layer. Light is output from the light output surface of the refractive index layer. When refractive indexes of the light guide body, the refractive index layer and the reflective member are $n_1$, $n_2$ and $n_3$, respectively, the following expression is established: $n_3 \geq n_1 > n_2$.

A planar light emitting element according to still another aspect of the present invention includes a reflective plate and a refractive index layer. The reflective plate is provided on the side opposite to a light output surface of a light guide body for transmitting light emitted by a light source. Light is output from the light output surface of the light guide body. The reflective plate is adapted to reflect light incident thereon. The refractive index layer is provided on the side opposite to the light output surface of the light guide body. When refractive indexes of the light guide body and the refractive index layer are $n_1$ and $n_2$, respectively, the following expressions are established: $n_1 > n_2$; and $0 < n_1 - n_2 \leq 0.17$.

A planar light emitting element according to still another aspect of the present invention includes a light source, a light guide body, a prism sheet and a high refractive index layer having a refractive index higher than those of the light guide body and the prism sheet. The light guide body is adapted to transmit light emitted by the light source. The prism sheet has a flat surface on the side of the light guide body. The high refractive index layer is provided between the light guide body and the prism sheet.

A planar light emitting element according to still another aspect of the present invention includes a light source, a light guide body, a prism sheet and a depolarized light transmission layer. The light guide body is adapted to transmit light emitted by the light source. The prism sheet has a flat surface on the side of the light guide body. The depolarized light transmission layer is provided between the light guide body and the prism sheet and is capable of transmitting at least 90% of S-polarized light components and at least 90% of P-polarized light components, the S-polarized light components and the P-polarized light components being contained in light having at least one wavelength within the visible light range and incident on the depolarized light transmission layer at an angle of 70 degrees with respect to an incident surface of the depolarized light transmission layer.

An image display element according still another aspect of the present invention includes a pair of substrates, a pair of polarizing plates sandwiching the pair of substrates, a liquid crystal layer provided between the substrates, and light focusing elements. Transmission opening sections are provided between the liquid crystal layer and one of the substrates and in respective pixels. The light focusing elements are provided on the side opposite to the liquid crystal layer with respect to the one of the substrates and between the one of the substrates and one of the polarizing plates. The light focusing elements focus light focus light on the respective transmission opening sections. The centers of the transmission opening sections are shifted from the centers of the respective pixels. Each transmission opening section provided in two of the pixels, which are adjacent to each other, is arranged to ensure that the centers of the transmission opening sections are closer to the boundary between the two pixels than the boundary between a pixel adjacent to either one of the two pixels and the one of the two pixels. The two pixels adjacent to each other are repeatedly arranged at a regular interval.

An image display device according still another aspect of the present invention includes an image display element for displaying an image, and a planar light emitting element for illuminating the image display element with light emitted by a light source. The image display element has a pair of substrates, a liquid crystal layer provided between the substrates, and first and second polarizing plates. A transmission opening section is provided between the liquid crystal and one of the substrates and in a pixel. The first polarizing plate is provided on the side opposite to the liquid crystal layer with respect to the one of the substrates. The second polarizing plate is provided between the liquid crystal layer and the other of the substrates and in contact with the liquid crystal layer. The planar light emitting element has a refractive index layer and a reflective plate. The refractive index layer is provided on the side of a light output surface of a light guide body for transmitting light emitted by a light source. Light is output from the light output surface of the light guide body. The reflective plate is adapted to reflect light output from the light guide body through an opening section. The other one of the substrates and the refractive index layer are closely arranged. In the image display element, the second polarizing plate polarizes light reflected on the reflective plate of the planar light emitting element and output from the planar light emitting element. The liquid crystal layer is adapted to change the polarization direction of the polarized light to allow the image display element to display an image.

An image display device according still another aspect of the present invention includes an image display element for displaying an image, and a planar light emitting element for illuminating the image display element with light emitted by a light source. The planar light emitting element has a light guide body, first and second refractive index layers, and a reflective plate. The light guide body is adapted to transmit light emitted by the light source. The first and second refractive index layers are laminated on the side of a light output surface of the light guide body. Light is output from the light output surface of the light guide body. An opening section is provided in the second refractive index layer provided between the light guide body and the first refractive index layer. The reflective plate is adapted to reflect light output from the light guide body through the opening section. The image display element has a pair of substrates, and a light focusing element. A transmission opening section is provided between the substrates and in a pixel. The light focusing element is provided between the planar light emitting element and one of the substrates and adapted to focus light output from the planar light emitting element on the transmission opening section.

An image display device according still another aspect of the present invention includes an image display element for displaying an image, and a planar light emitting element having a light source. The planar light emitting element is adapted to illuminate the image display element with light emitted by the light source. The image display element has a pair of substrates, a liquid crystal layer and a light focusing element. The liquid crystal layer is provided between the substrates. A transmission opening section is provided in a pixel. The light focusing element is adapted to focus light output from the planar light emitting element on the transmission opening section. The planar light emitting element has a light guide body, a prism sheet, and a high refractive index layer. The light guide body is adapted to transmit light emitted by the light source. The prism sheet has a flat surface on the side of the light guide body. The high refractive index layer has a refractive index higher than those of the light guide body and the prism sheet and is provided between the light guide body and the prism sheet.

An image display device according still another aspect of the present invention includes an image display element for displaying an image, and a planar light emitting element having a light source. The planar light emitting element is adapted to illuminate the image display element with light emitted by the light source. The image display element has a pair of substrates, a liquid crystal layer and a light focusing element. The liquid crystal layer is provided between the substrates. A transmission opening section is provided in a pixel. The light focusing element is adapted to focus light output from the planar light emitting element on the transmission opening section. The planar light emitting element has a light guide body, a prism sheet, and a depolarized light transmission layer. The light guide body is adapted to transmit light emitted by the light source. The prism sheet has a flat surface on the side of the light guide body. The depolarized light transmission layer is provided between the light guide body and the prism sheet and is capable of transmitting at least 90% of S-polarized light components and at least 90% of P-polarized light components, the S-polarized light components and the P-polarized light components being contained in light having at least one wavelength within the visible light range and incident on the depolarized light transmission layer at an angle of 70 degrees with respect to an incident surface of the depolarized light transmission layer.

The present invention provides a planar light emitting element, an image display element, and an image display device using the planar light emitting element and the image display element. The planar light emitting element is capable of outputting light substantially collimated or spread at a small angle in at least one direction parallel to an axis of orthogonal coordinates in a plane.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

A description will be made of a first embodiment of the present invention with reference to FIGS. 1 to 7C.

Figure 1:
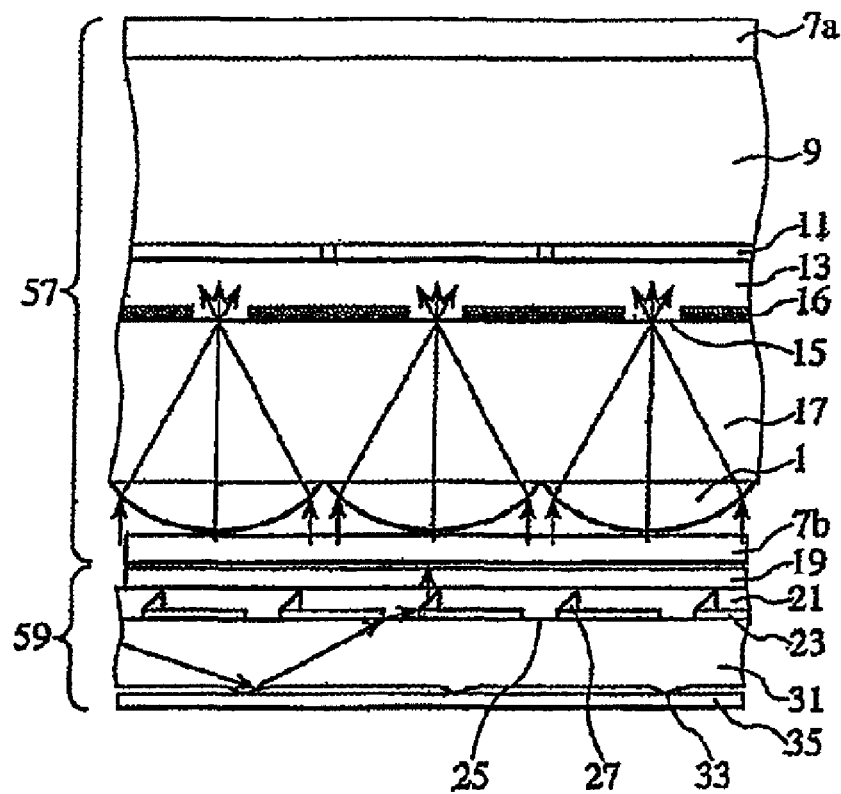
FIG. 1 is a cross sectional view of a planar light emitting element and an image display element according to a first embodiment of the present invention.

FIG. 1 is a cross sectional view of a planar light emitting element and an image display element, which constitute an image display device. FIG. 1 shows a transflective liquid crystal display element 57 and a backlight 59. The liquid crystal display element 57 serves as the image display element for displaying an image. The backlight 59 serves as the planar light emitting element for illuminating light emitted by a light source on the image display element. The backlight 59 is used for a liquid crystal display device.

Referring to FIG. 1, a light guide plate 31 receives light emitted by the light source (not shown). The light is repeatedly reflected in the light guide plate 31. The light guide plate 31 has a reflective groove 33 on a lower side thereof, that is, on the side opposite to the liquid crystal display element 57 (the reflective groove 33 is provided on the side opposite to a light output surface of the light guide plate 31). A reflective sheet 35 is provided on the side (lower side) opposite to the light output surface of the light guide plate 31 with respect to the reflective groove 33. A first low refractive index layer 21 serves as a first refractive index layer. A second low refractive index layer 23 serves as a second refractive index layer. The first and second low refractive index layers 21 and 23 are provided on the side of the liquid crystal display element 57 with respect to the light guide plate 31. The light guide plate 31, the second low refractive index layer 23 and the first low refractive index layer 21 are laminated in this order (the second low refractive index layer 23 is present between the light guide plate 31 and the first low refractive index layer 21). The light incident on the light guide plate 31 is totally reflected on the interface between the light guide plate 31 and the second low refractive index layer 23 and propagates in the light guide plate 31.

The light is output from the light output surface of the light guide plate 31 through a light output opening section 25. The light output opening section 25 is formed by removing a portion of the second low refractive index layer 23 to transmit the light to the liquid crystal display element 57 from the light-guide plate 31. A portion of the light guide plate 31 and a portion of the first low refractive index layer 21 are directly in contact with each other at the light output opening section 25. A reflective mirror 27 is provided on a light output surface of the second low refractive index layer 23. That is, the reflective mirror 27 is provided on the side of the liquid crystal display element 57 with respect to the second low refractive index layer 23. Light is output from the light output surface of the second low refractive index layer 23. The reflective mirror 27 serves as a reflective plate. Light output from the light guide plate 31 through the light output opening section 25 is reflected on the reflective mirror 27. The reflected light is output from the backlight 59. In other words, the light reflected on the reflective mirror 27 is output from the first low refractive index layer 21.

The image display element 57 according to the present embodiment includes a pair of substrates (an upper substrate 9 and a lower substrate 17), a pair of polarizing plates 7a and 7b, a liquid crystal layer 13, and a lenticular lens 1. The polarizing plates 7a and 7b sandwich the upper and lower substrates 9 and 17. The liquid crystal layer 13 and a transmission opening section 15 are provided between the upper and lower substrates 9 and 17. The lenticular lens 1 is provided between the lower substrate 17 and the planar light emitting element (backlight 59) and adapted to focus light output from the planar light emitting element (backlight 59) on the transmission opening section 15. The lenticular lens 1 serves as a light focusing element.

A diffusion sheet 19 is adapted to equalize luminance levels of light output from the entire light output surface of the backlight 59, i.e., luminance levels of light output from the light output surface of the first low refractive index layer 21. The diffusion sheet 19 preferably diffuses the light output from the backlight 59 without affecting the directivity of light output from the backlight 59.

The lenticular lens 1 receives light transmitted through the polarizing plate 7b and focuses the received light on the transmission opening section 15, resulting in an increase in the amount of light transmitted through the transmission opening section 15. When the thickness of the lower substrate 17 is reduced, the amount of the light transmitted through the transmission opening section 15 is increased. This results in the fact that the viewing angle of the image display element is increased. On the other hand, when the thickness of the lower substrate 17 is increased, a luminance level of light propagating in a front direction is increased. The thickness of the lower substrate 17 is measured in a direction parallel to a normal to the light output surface of the light guide plate 31. The front direction is parallel to the normal to the light output surface of the light guide plate 31. It is therefore desirable that the thickness of the lower substrate 17 be determined based on characteristics of a display device to be used. The light transmitted through the transmission opening section 15 passes through the liquid crystal layer 13, a color filter 11 and the upper substrate 9 and reaches the polarizing plate 7a. The polarizing plate 7a then adjusts the amount of the light to be transmitted therethrough. The liquid crystal display element 57 then displays an image.

A reflective display section 16 is provided in the liquid crystal display element 57. A transflective liquid crystal display device can be achieved by means of the reflective display section 16. The liquid crystal display element 57 may have a configuration similar to that of a typical transflective liquid crystal display element. When the liquid crystal display element 57 is an active matrix type, a thin film transistor (TFT) may be provided in the reflective display section 16 to perform switching of the liquid crystal layer.

In the transflective liquid crystal display element 57 according to the present embodiment, circularly polarizing plates may be used as the polarizing plates 7a and 7b. In addition, a reflective polarizing plate may be provided on the side of the backlight 59 with respect to the polarizing plate 7b to reflect light polarized in a direction in which the polarizing plate 7b absorbs light and causes the reflected light to return to the backlight 59. The returned light can be reused, resulting in an improvement in light utilization efficiency.

Figure 2:
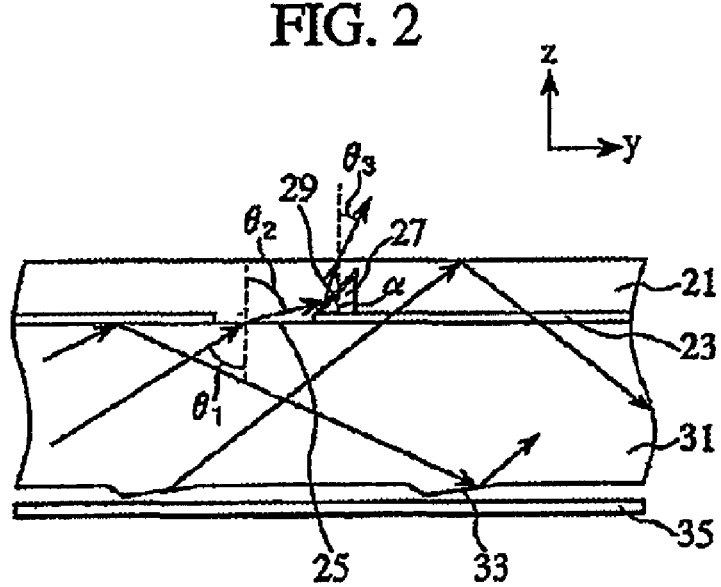
FIG. 2 is a cross sectional view of the planar light emitting element according to the first embodiment.

Next, a description will be made of the backlight 59 according to the present embodiment with reference to FIG. 2 which is an enlarged cross sectional view of the backlight 59.

As described above, light incident on the light guide plate 31 is totally reflected on the interface between the light guide plate 31 and the second low refractive index layer 23 and transmitted in the light guide plate 31. The light is then output from the light guide plate 31 through the light output opening section 25 to the first low refractive index layer 21. To allow the light to propagate in the abovementioned way, it is necessary that the following expression (1) be established:

$$n_1 > n_2 > n_3 \qquad \text{Expression (1)}$$

where $n_1$ is a refractive index of the light guide plate 31, $n_2$ is a refractive index of the first low refractive index layer 21, and $n_3$ is a refractive index of the second low refractive index layer 23. The light transmitted to the first low refractive index layer 21 through the light output opening section 25 is reflected on the reflective mirror 27 and output from the first low refractive index layer 21 to the side of the image display element 57. The reflective mirror 27 (serving as the reflective plate) may have metal (having high reflectance such as silver or aluminum) formed thereon or may have a reflective film 29 (composed of a dielectric multi-layer film) formed thereon to allow the light to be efficiently output from the first low refractive index layer 21. In the case where the light is totally reflected on the interface between the light guide plate 31 and the second low refractive index layer 23 and propagates in the light guide plate 31, the light is incident on the interface between the light guide plate 31 and the second low refractive index layer 23 at an incident angle $\theta_1$ with respect to a normal to the light output surface of the light guide plate 31 as shown in FIG. 2. In this case, the following expression (2) is established.

$$\theta_1 > \sin^{-1}\left(\frac{n_3}{n_1}\right) \qquad \text{Expression (2)}$$

Among light incident on the light output opening section 25, light incident at an incident angle $\theta_1$ satisfying expression (3) with respect to the normal to the light output surface of the light guide plate 31 is output to the first low refractive index layer 21.

$$\sin^{-1}\left(\frac{n_2}{n_1}\right) > \theta_1 > \sin^{-1}\left(\frac{n_3}{n_1}\right) \quad \text{Expression (3)}$$

In this case, the light is output from the light output opening section 25 to the first low refractive index layer 21 at an output angle $\theta_2$ with respect to the normal to the light output surface of the light guide plate 31 to ensure that the following expression (4) is established.

$$90° > \theta_2 > \sin^{-1}\left(\frac{n_3}{n_1}\right) \quad \text{Expression (4)}$$

It is therefore desirable that the refractive index n2 be minimized compared with the refractive index $n_1$ to increase an angle of the direction of light propagating in the light guide plate 31 with respect to the light output surface of the light guide plate 31. To reduce a spreading angle of light output to the first low refractive index layer 21 (Y direction (parallel to the light output surface of the light guide plate 31) shown in FIG. 2), it is desirable that the difference between the refractive indexes $n_2$ and $n_3$ be small. For example, when polycarbonate having a refractive index of 1.59 is used as the light guide plate 31, and fluorinated polymer having a refractive index of 1.34 is used as the second low refractive index layer 23, light incident on the interface between the light guide plate 31 and the second low refractive index layer 23 at an incident angle $\theta_1$ (with respect to the normal to the light output surface of the light guide plate 31) of more than 32.6 degrees is totally reflected on the interface between the light guide plate 31 and the second low refractive index layer 23 and propagates in the light guide plate 31.

When the refractive index n2 is 1.351, the following expression is established: 90 degrees>$\theta_2$>82.68 degrees. In this case, a spreading angle $\theta_3$ (shown in FIG. 2) of light output from the first low refractive index layer 21 can be ±5 degrees. Based on a reference line passing the point at which the light is output from the first low refractive index layer 21 and parallel to the normal to the light output surface of the light guide plate 31, the spreading angle $\theta_3$ is determined. The direction of the reference line is defined as a spreading angle $\theta_3$ of ±0 degrees. The light guide plate 31, the first and second low refractive index layers 21 and 23 can be regarded as an optical waveguide structure. In this case, the light guide plate 31 is regarded as a core, and the first and second low refractive index layers 21 and 23 are regarded as cladding layers. An optical waveguide provided with a core having a refractive index of 1.351 and a cladding layer having a refractive index of 1.34 has a numerical aperture of 0.17. In this case, the difference between the refractive index of the core and the refractive index of the cladding layer can be sufficiently controlled. The refractive indexes can be controlled accurately to obtain a necessary viewing angle of the image display element 57.

As described above, it is desirable that the difference between the refractive index of the light guide plate 31 and the refractive index of the second low refractive index layer 23 be large. In addition, it is desirable that the difference between the refractive index of the first low refractive index layer 21 and the refractive index of the second low refractive index layer 23 be small for improvement of the directivity of light output from the backlight 59.

It is therefore desirable that expression (5) be established.

$$n_1 - n_2 > n_2 - n_3 \quad \text{Expression (5)}$$

When expressions (1) and (5) are established, the planar light emitting element (backlight 59) is capable of outputting light having high directivity.

It is known that a material having a microscopic void exhibits a refractive index of 1.3 or less. When such a composite low refractive index material is used for the first and second low refractive index layers 21 and 23, the effect of confining light in the light guide plate 31 is increased. The composite low refractive index material is therefore desirable.

In addition, the composite low refractive index material is desirable since the first low refractive index layer 21 having a low refractive index is capable of suppressing an increase in the spreading angle of light output from the first low refractive index layer 21. A material having a large number of voids, such as silica aerosol, exhibits a refractive index of 1.03. When any of those low refractive index materials is used, the second low refractive index layer 23 may serve as an air layer.

To increase the amount of light to be transmitted through the transmission opening section 15 by means of the lenticular lens 1 serving as the light focusing element, it is necessary that the spreading angle of light output from the backlight 59 (serving as the planar light emitting element) be ±7 degrees or less. The spreading angle is preferably ±5 degrees or less. To obtain this directivity, it is necessary that a numeral aperture (NA) (which is a square root of the difference between the square of the refractive index n2 of the first low refractive index layer 21 and the square of the refractive index $n_3$ of the second low refractive index layer 23) obtained by expression (6) be 0.24 or less. The NA is preferably, 0.17 or less.

$$NA = \sqrt{n_2^2 - n_3^2} \quad \text{Expression (6)}$$

In general, a viewing angle (spreading angle) of light is set to ensure that a luminance level of the light is half of the peak luminance level. The viewing angle (spreading angle) may be determined based on the general method.

Light incident on the interface between the light guide plate 31 and the first low refractive index layer 21 at a large propagation angle (the propagation angle is defined as an angle of (90 degrees−$\theta_1$)) is output from the light guide plate 31, while light incident on the interface between the light guide plate 31 and the first low refractive index layer 21 at a small propagation angle is reflected on the interface. Thus, as the light propagates in the light guide plate 31, the ratio of light to be incident on the interface at a small propagation angle relative to light to be incident on the interface at a large propagation angle is increased. This results in the fact that the amount of light to be output from the light guide plate 31 is reduced. The reflective groove 33 is therefore provided in the surface (of the light guide plate 31) opposite to the light output surface of the light guide plate 31 to allow luminance levels across the light output surface of the backlight 59 to be substantially constant. The depth (measured in the direction parallel to the normal to the light output surface of the light guide plate 31) of the reflective groove 33, an angle of an inclined surface of the reflective groove 33 (with respect to the light output surface of the light guide plate 31), the interval of the reflective grooves 33 (when a plurality of the reflective grooves 33 is provided) can be adjusted to allow luminance levels across the light output surface of the backlight 59 to be substantially constant. When light is reflected on the reflective groove 33, the incident angle $\theta_1$ is reduced. Even if light which is transmitted through the second low refractive index layer 23 before it is transmitted through the light output opening section 25 is generated, the light is totally reflected on the light output surface of the first low refractive index layer 21 and returned to the light guide plate 31.

The reflective sheet 35 is formed of metal having high reflectance such as silver or aluminum and is provided to reflect light transmitted through the light guide plate 31 toward the light guide plate 31 and allow the light to be reused.

If light is incident on the reflective mirror 27 from a portion other than the light output opening section 25, a component of the light may be lost. However, light is totally reflected on the interface between the light guide plate 31 and the second low refractive index layer 23 and propagates in the light guide plate 31, as described above. The light does not reach the reflective mirror 27 through the second low refractive index layer 23. Therefore, a loss of light is not increased in the backlight 59 due to the reflective mirror 27.

In addition, since light reflected on the reflective mirror 27 is output from the backlight 59, the light basically reaches the reflective film 29 only once. Thus, even when the reflective film 29 is formed of metal, a loss of light can be suppressed to a low level. An angle $\alpha$ (shown in FIG. 2) of a surface of the reflective mirror 27 with respect to a surface of the second low refractive index layer 23 may be set to ensure that light to be incident on the surface of the reflective mirror 27 propagates in a predetermined direction. To reflect light output from the light guide plate 31 in a direction nearly parallel to the light output surface of the light guide plate 31 on the surface of the reflective mirror 27, it is preferable that the angle $\alpha$ be set to 45 degrees or around. When the spreading angle $\theta_3$ of light output from the first low refractive index layer 21 is $\pm\gamma$, the angle $\alpha$ may be set to $(45+\gamma)$ degrees. For example, when the angle $\theta_3$ is 3.66 degrees, the angle $\alpha$ is set to 48.66 degrees.

The first and second low refractive index layers 21 and 23 may be formed by coating and curing a transparent resin material existing in a solution state. In addition, the first and second low refractive index layers 21 and 23 may be formed by coating and curing a transparent inorganic material. In order to form the light output opening section 25 in the second low refractive index layer 23, the second low refractive index layer 23 may be formed of a photosensitive material, and patterning may be performed to expose the second low refractive index layer 23 during light curing. A photolithographic technique may be used to form the light output opening section 25 in the second low refractive index layer 23.

In addition, the second low refractive index layer 23 may be printed to form the light output opening section 25 in the second low refractive index layer 23.

To form the reflective mirror 27, a photosensitive material may be exposed by light with an adjusted amount and formed into a triangle shape. Alternatively, a groove having a shape of the reflective mirror 27 is formed in the first low refractive index layer 21. The reflective film 29 is provided in the groove. The first low refractive index layer 21 is attached to the light guide plate 31 with the second refractive index layer 23 formed on the light guide plate 31. When the groove is not formed, the reflective mirror 27 is formed on the second low refractive index layer 23, and the reflective film 29 is then formed on the reflective mirror 27.

Figure 3:
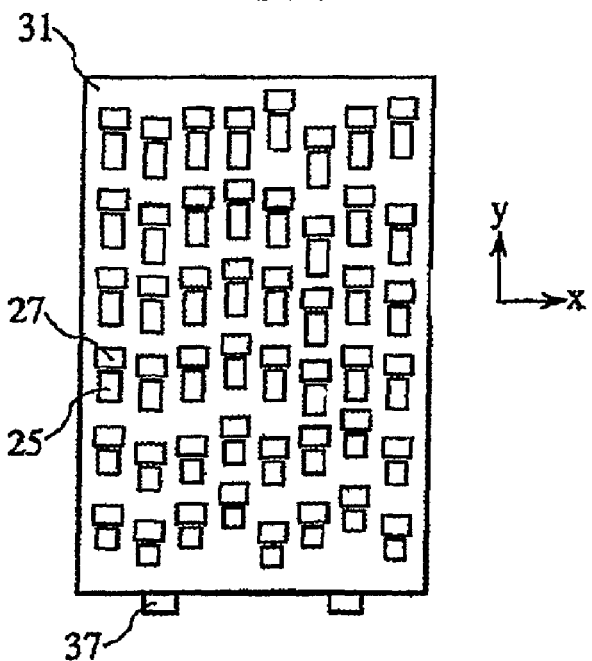
FIG. 3 is a front view of the planar light emitting element according to the first embodiment.

FIG. 3 is a front view of the backlight 59. In FIG. 3, the light output opening sections 25 (each serving as the opening section) and the reflective mirrors 27 (each serving as the reflective plate) are randomly arranged in order to obtain substantially constant luminance levels and spreading angles of light across the light output surface of the backlight 59. The area of each of the reflective mirrors 27 is set to be smaller than the area of each pixel of the liquid crystal display element 57 in order to prevent a moiré pattern from occurring due to the pixels and the luminance levels from being uneven. The closer to the side of light emitting diodes (LEDs) 37 (each serving as the light source) the light output opening section 25 is, the smaller the area (obtained by multiplying the width by the length) of the light output opening section 25 is. On the other hand, the more distant from the side of light emitting diodes 37 the light output opening section 25 is, the larger the area of the light output opening section 25 is. This prevents the luminance level from being gradually reduced from the side of the LEDs to the side opposite to the LEDs.

The amount of light output from the backlight 59 can be adjusted by changing the shape of each of the light output opening sections 25 and the density of the light output opening sections 25 in the abovementioned way. In addition, the amount of light output from the backlight 59 can be adjusted by changing the height and the width of each of the reflective mirrors 27. The height of each of the reflective mirrors 27 is measured in the direction parallel to the normal to the light output surface of the first low refractive index layer 21. The width of each of the reflective mirrors 27 is measured in an X direction shown in FIG. 3. The X direction is parallel to an incident surface (side surface) of the light guide plate 31.

Figure 4:
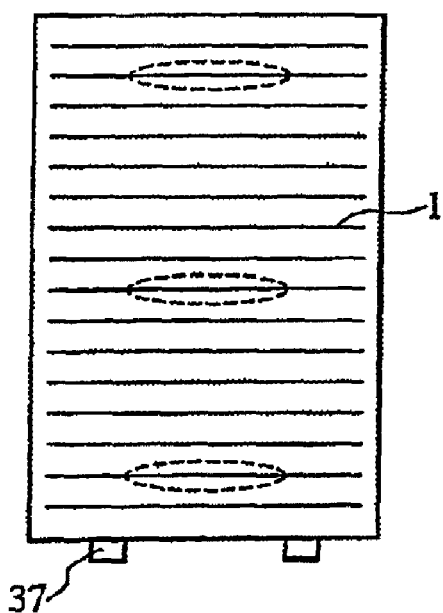
FIG. 4 is a front view of another planar light emitting element according to the first embodiment.
Figure 5:
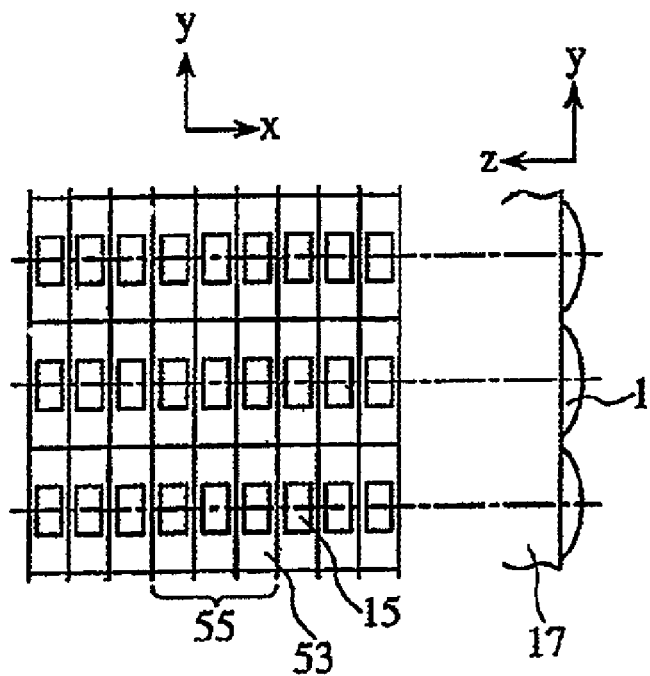
FIG. 5 is a diagram showing the arrangement of a pixel section and a lenticular lens according to the first embodiment.

FIG. 4 is a front view of the image display element 57. FIG. 5 shows the arrangement of a pixel section and the lenticular lenses 1.

Referring to FIG. 5, reference numeral 55 denotes a pixel, and reference numeral 53 denotes a sub-pixel. The pixels 55 are two-dimensionally arranged in a matrix. Each of the pixels 55 is divided into three sub-pixels 53 of respective colors (red, green and blue). The three sub-pixels 53 are arranged in a horizontal direction (which is a row direction, i.e., the X direction shown in FIG. 5), that is, in a right-left direction when a display screen is viewed. Each of the lenticular lenses 1 has curvature in the Y direction shown in FIG. 5 and extends in the X direction. Each of the lenticular lenses 1 receives light having high directivity in the Y direction and output from the backlight 59 and focuses the light on the corresponding transmission opening section 15.

Referring to FIG. 4, each of ellipses conceptually indicates directivity of light output from the backlight 59. Light to be received by the lenticular lens 1 has high directivity in the Y direction and is output at a large viewing angle in the X direction. It is desirable for the image display device that the X direction (in which the viewing angle is large) be the right-left direction (when the display screen is viewed) and the Y direction (in which the light has high directivity) be a top-bottom direction (when the display screen is viewed). Each of the lenticular lenses 1 therefore focuses light on the transmission opening sections 15 provided in the respective sub-pixels 53 arranged in the X direction. It is preferable that the spreading angle of light output from the backlight 59 be adjusted to obtain a desirable viewing angle in the Y direction in which the lenticular lenses do not focus the light.

When the lenticular lens 1 is used as the light focusing element in the abovementioned way, it is desirable that light output from the backlight 59 have high directivity in a certain direction (of orthogonal coordinates) and be output within a large angle in the direction (of the orthogonal coordinates) perpendicular to the certain direction.

In order to efficiently focus light on the transmission opening section 15, the lenticular lens 1 is preferably an aspherical lens. When the lower substrate 17 has a small thickness and the lenticular lens 1 has a small radius of curvature, the use of an aspherical lens is effective. When the lenticular lens 1 is capable of sufficiently focusing light on the transmission opening section 15, the lenticular lens 1 may be a spherical lens. It is known that when curvature of a central portion of the lenticular lens 1 is reduced to ensure a surface of the lenticular lens 1 is nearly flat, a luminance level of light transmitted through the transmission opening section 15 and propagating in the front direction can be high. In the present embodiment, curvature of a central portion of the lenticular lens 1 may be reduced to ensure a surface of the lenticular lens 1 is nearly flat.

In the present embodiment, the lenticular lens 1 is provided on the lower substrate 17. The lenticular lens 1, however, may be reversed in a Z direction (the curved surface of the lenticular lens 1 may face the transmission opening section 15) and provided on another transparent substrate, or may be formed on the polarizing plate 7b.

In addition, the lenticular lens 1 may be covered with and embedded in a material having a refractive index different from that of the lenticular lens 1 to ensure a flat surface of the lenticular lens 1. When the lenticular lens 1 is embedded in the abovementioned material, it is preferable that the polarizing plate 7b be attached to the surface of the lenticular lens 1 since a reflection of light on the surface of the polarizing plate 7b attached to the surface of the lenticular lens 1 can be suppressed. The polarizing plate 7b may be provided between the lower substrate 17 and the lenticular lens 1.

The width, height and curvature of the lenticular lens 1 may be modulated to allow the lenticular lens 1 to provide an optical diffusion function. It is especially preferable that the width and height of the lenticular lens 1 be changed while the curvature of the lenticular lens 1 is maintained. This makes it possible to give the lenticular lens 1 a high property for diffusing light in a direction perpendicular to the focusing direction of the lenticular lens 1 while the focal distance of the lenticular lens 1 is maintained. When the lenticular lens 1 is capable of sufficiently diffusing light, and luminance levels of an image displayed by the liquid crystal element 57 are substantially constant, the diffusion sheet 19 is not necessary. The first low refractive index layer 21 may have a concavo-convex surface to exhibit a property for diffusing light. Alternatively, the first low refractive index layer 21 may have the property for diffusing light.

Figure 6:
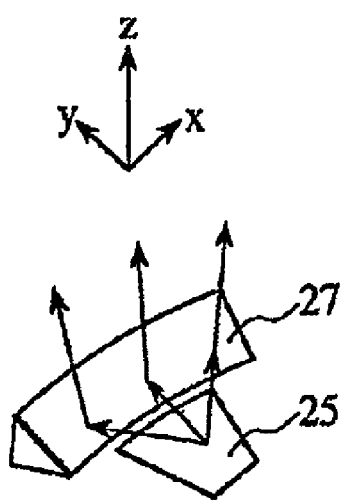
FIG. 6 is a perspective view of a light output opening section and a reflective mirror according to the first embodiment.

FIG. 6 is a perspective view of the light output opening section 25 and the reflective mirror 27.

Light output from the light output opening section 25 is reflected on the reflective mirror 27. The spreading angle of light in an optical axis (a direction nearly parallel to the Y direction in this case) of the reflective mirror 27 is determined based on the spreading angle of light output from the light output opening section 25. The spreading angle of the light in a direction (the X direction) perpendicular to the optical axis can be controlled by adjusting the shape of the reflective mirror 27. When the reflective mirror 27 has a curved portion with a radius of curvature located on the side of the light output opening section 25, the spreading angle of light in the direction (X direction) perpendicular to the optical axis can be suppressed. To reduce the spreading angle in the X direction, the area of the light output opening section 25 is reduced to ensure that the center of the radius of curvature is located in the light output opening section 25. The width (measured in the X direction) of the light output opening section 25 is smaller than the width (measured in the X direction) of the reflective mirror 27 to ensure that light transmitted through the light output opening section 25 is reflected on the reflective mirror 27. The closer to the reflective mirror 27 a portion of the light output opening section 25 is, the larger the width of the portion of the light output opening section 25 is. On the other hand, the more distant from the reflective mirror 27 a portion of the light output opening section 25 is, the smaller the width of the portion of the light output opening section 25 is.

Figure 7A:
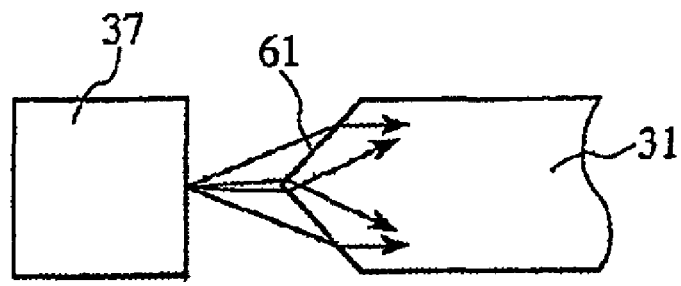
FIGS. 7A to 7C are perspective views of incident surfaces of light guide plates according to the first embodiment.
Figure 7B:
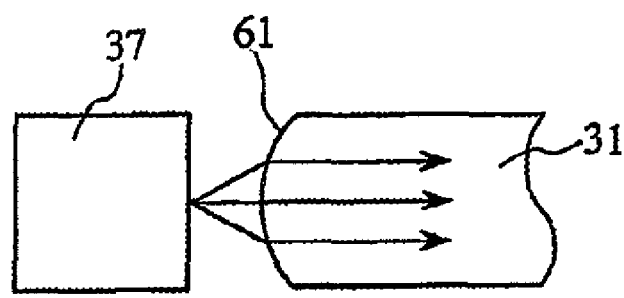
Figure 7C:
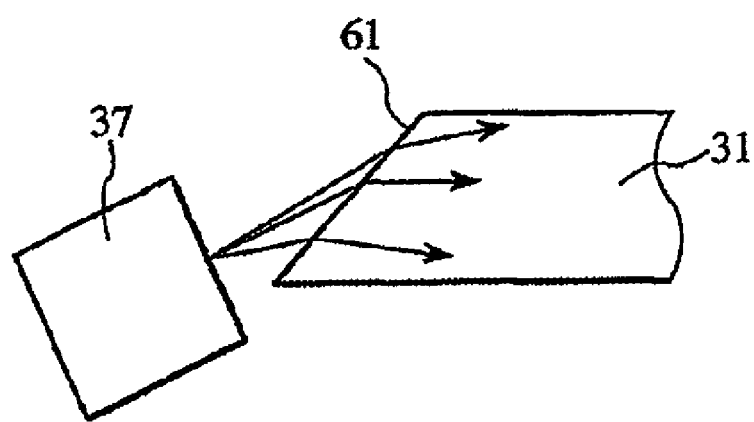

Each of FIGS. 7A to 7C shows a cross section of the light guide plate 31 having an incident surface 61 on which light output from the LED 37 is incident. In order to increase the amount of light incident on the light guide plate 31, it is preferable that the propagation angle (defined as an angle of (90 degrees−$\theta_1$) shown in FIG. 2) of light incident on the light guide plate 31 is small. The incident surface 61 of the light guide plate 31 may be shaped into a convex prism form as shown in FIG. 7A, shaped into a convex cylindrical lens form as shown in FIG. 7B, and shaped into a wedge form as shown in FIG. 7C, to ensure that the propagation angle of light incident on the light guide plate 31 is small. When the incident surface 61 of the light guide plate 31 is shaped into a wedge form, the LED 37 is arranged to ensure that the surface of the LED 37 is not perpendicular to the light output surface of the light guide plate 31.

In the present embodiment, the planar light emitting element is capable of outputting light having high directivity in a certain direction and across the light output surface thereof. However, the degree and the direction of the directivity may be varied depending on the location. It is desirable that a luminance level of light output from light output surface of the backlight 59 be adjusted based on the location of the light output surface to obtain a constant luminance level (front luminance level) of light propagating in the front direction when the light focusing element is used. This allows the front luminance level of light illuminated on the display screen of the image display device using the light focusing element to be substantially constant.

Since the planar light emitting element according to the present embodiment is capable of outputting light having high directivity in a single axial direction, the lenticular lens 1 is used. The lenticular lens 1 can be used to focus light on the transmission opening section 15 when the backlight 59 is capable of outputting light substantially collimated or spread at a small angle in all the directions in a plane parallel to the light output surface of the backlight 59. In this case, a hologram sheet, a lenticular lens sheet, a prism sheet, or a lens array sheet may be provided on the light output side of the liquid crystal display element 57 to increase the viewing angle.

Alternatively, a hologram sheet, a lenticular sheet, or a prism sheet may be provided between the backlight 59 and the liquid crystal display element 57 to increase the spreading angle in a single axial direction. In addition, a micro lens array may be provided for each sub-pixel in place of the lenticular lens 1 when the backlight 59 is capable of outputting light substantially collimated or spread at a small angle in all the directions in a plane parallel to the light output surface of the backlight 59. In this case, it is preferable that the transmission openings 15 be arranged in a zigzag fashion, i.e., a delta alignment to allow micro lenses of the micro lens array to be densely arranged.

The planar light emitting element according to the present embodiment is capable of outputting light having high directivity in at least one direction of orthogonal coordinates. The planar light emitting element, therefore, is capable of taking advantaging of the focusing function of the light focusing element, i.e., a lens array.

Next, a description will be made of a second embodiment of the present invention with reference to FIGS. 8 to 12.

Figure 8:
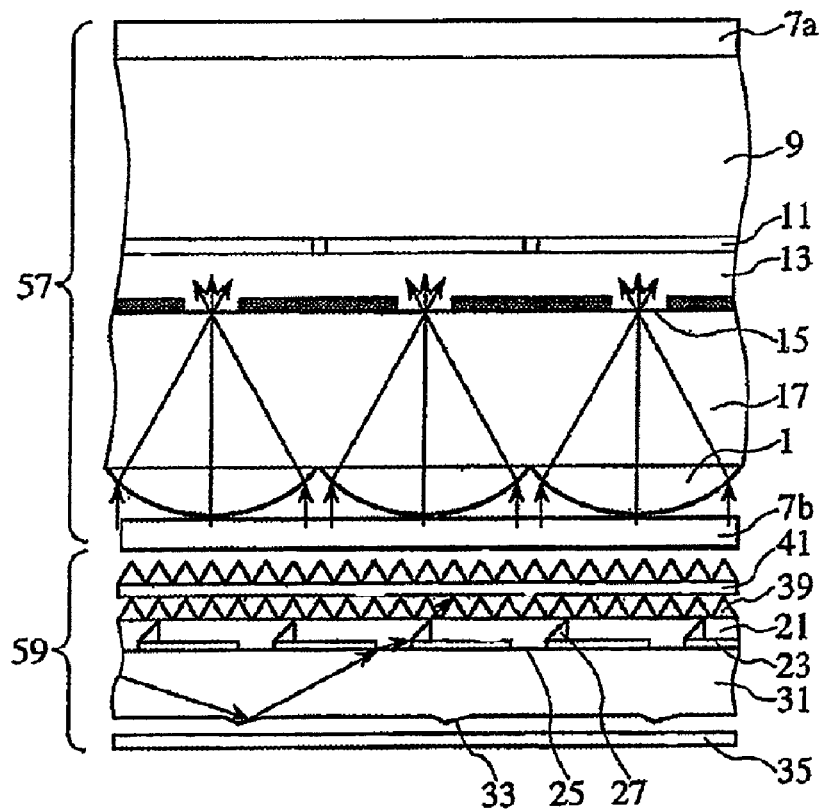
FIG. 8 is a cross sectional view of a planar light emitting element and an image display element according to a second embodiment of the present invention.

FIG. 8 is a cross sectional view of a planar light emitting element and an image display element according to the second embodiment. In the image display element according to the second embodiment, a plurality of prism layers (a prism array 31 and a prism sheet 41) is provided on the side of the light output surface of the first low refractive index layer 21. The prism array 39 and the prism sheet 41 are staged in this order on the side of the light output surface of the first low refractive index layer 21. Other portions of the image display element according to the second embodiment are essentially the same as those of the image display element according to the first embodiment.

Light incident on the light guide plate 31 from the light source is totally reflected on the interface between the light guide plate 31 and the second low refractive index layer 23 and propagates in the light guide plate 31. A transparent adhesion layer 63 is provided in the light output opening section 25 and between the light guide plate 31 and the first low refractive index layer 21. Light is output from the light guide plate 31 to the side of the liquid crystal display element 57. The light transmitted through the light output opening section 25 is reflected on the reflective mirror 27. The reflected light is transmitted through the prism array 39. The light output from the prism array 39 has high directivity. The prism sheet 41 is adapted to direct the light output from the prism array 39 toward the front direction (i.e., the Z direction parallel to the normal to the light output surface of the light guide plate 31). The light directed to the front direction is incident on and transmitted through the polarizing plate 7b. The lenticular lens 1 focuses the light transmitted through the polarizing plate 7b on the transmission opening section 15 to increase effective transmittance.

Figure 9:
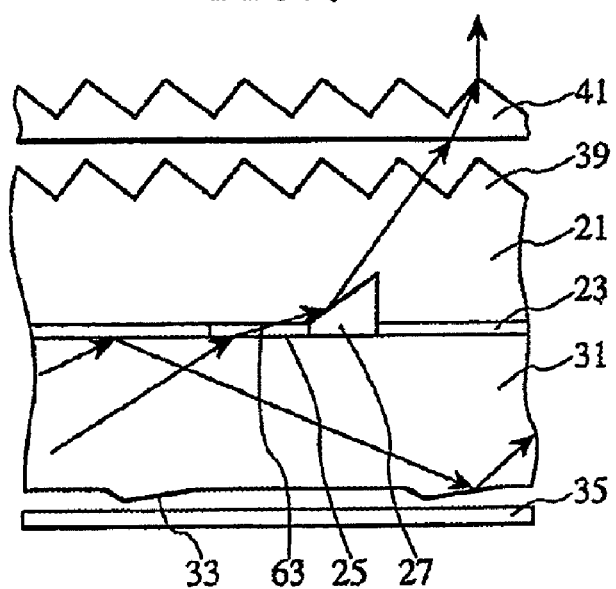
FIG. 9 is a cross sectional view of the planar light emitting element according to the second embodiment.

FIG. 9 is a cross sectional view of the backlight 59 according to the second embodiment. The backlight 59 according to the second embodiment will be described in detail.

Light is totally reflected on the interface between the light guide plate 31 and the second low refractive index layer 23 and propagates in the light guide plate 31. The light is output from the light guide plate 31 through the light output opening section 25 to the first low refractive index layer 21. The transparent adhesion layer 63 is provided in the light output opening section 25 and serves as an adhesive between the light guide plate 31 and the first low refractive index layer 21. When the transparent adhesion layer 63 has a refractive index higher than that of the light guide plate 31, the angle $\theta_2$ of the direction of propagation of light output from the light guide plate 31 with respect to the normal to the light output surface of the light guide plate 31 is the same as that in the first embodiment. For example, when polycarbonate having a refractive index of 1.59 is used as the light guide plate 31, fluorinated polymer having a refractive index of 1.34 is used as the second low refractive index layer 23, and fluorinated polymer having a refractive index of 1.351 is used as the first low refractive index layer 21, the following expression is established: 90 degrees>$\theta_2$>82.68 degrees.

In the present embodiment, the reflective mirror 27 has a hollow interior. Light is totally reflected on the reflective mirror 27. If the reflective mirror 27 is formed to ensure that light reflected on the reflective mirror 27 is directed toward the front direction, the light is not totally reflected on the reflective mirror 27, that is, a component of the light is transmitted through the reflective mirror 27. Therefore, the reflective mirror 27 is formed to ensure that light reflected on the reflective mirror 27 is directed toward a direction oblique to the front direction. The prism sheet 39 is provided on the surface of the first low refractive index layer 21 to suppress an increase in the spreading angle of light output from the first low refractive index layer 21 and obtain light having high directivity. Light is output from the prism sheet 39 in a direction oblique to the front direction. The prism sheet 41 is therefore provided to direct the light output from the prism sheet 39 toward the front direction.

Figure 10A:
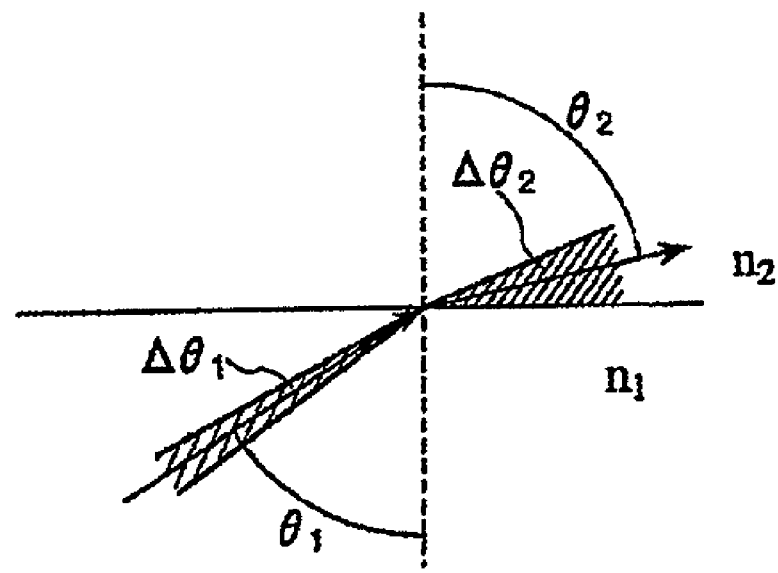
FIGS. 10A and 10B are diagrams each showing an effect of a prism array according to the second embodiment.
Figure 10B:
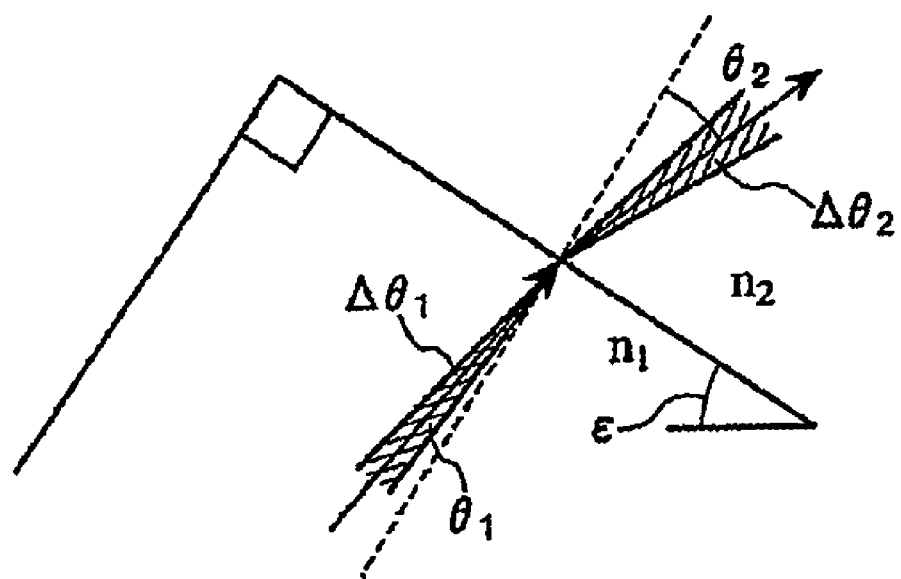

Next, a description will be made of an effect of suppressing an increase in the spreading angle of light output from the prism sheet 39 with reference to FIGS. 10A and 10B. Referring to FIG. 10A, light is incident from a medium having a refractive index $n_1$ on the interface between the medium having a refractive index $n_1$ and a medium having a refractive index $n_2$ at an incident angle $\theta_1$ with respect to a normal to the interface and output to the medium having a refractive index $n_2$ at an output angle $\theta_2$ with respect to the normal to the interface. Snell's law (expression (7)) is used to obtain the amount $\Delta\theta_2$ of the change in the output angle $\theta_2$ when the incident angle $\theta_1$ is changed by $\Delta\theta_1$.

$$n_1 \sin\theta_1 = n_2 \sin\theta_2 \qquad \text{Expression (7)}$$

The amount $\Delta\theta_2$ of the change in the output angle $\theta_2$ is represented by expression (8).

$$\Delta\theta_2 \cong \frac{n_1 \cos\theta_1}{\sqrt{n_2^2 - (n_1 \sin\theta_1)^2}} \Delta\theta_1 \qquad \text{Expression (8)}$$

Based on expression (8), when the light is incident from a direction perpendicular to the interface, that is, the incident angle $\theta_1$ is equal to zero, expression (9) is established.

$$\Delta\theta_2 \cong \frac{n_1}{n_2} \Delta\theta_1 \qquad \text{Expression (9)}$$

As the incident angle $\theta_1$ is increased, the amount $\Delta\theta_2$ of the change in the output angle $\theta_2$ is increased. As shown in FIG. 10A, when the incident angle $\theta_1$ is large, the spreading angle of the light transmitted through the interface is large, compared with the case where the light is incident from the direction perpendicular to the interface.

To suppress the increase in the spreading angle of the light transmitted through the interface, a prism is formed on the surface of the medium having the refractive index $n_1$ to cause the light to be incident on the interface at an almost right angle with respect to the interface. In this case, an angle ∈ of an inclined surface of the prism array 39 (with respect to the Y direction) is preferably set to ensure that light having the highest intensity (or the highest luminance level) among light to be incident on the inclined surface is incident from a direction substantially perpendicular to the inclined surface. In this case, the amount of the change in the spreading angle is substantially equal to a value obtained by expression (9).

The prism array has a prism, and the apex angle of a tip portion of the prism is 90 degrees to prevent light having a high luminance level from being blocked by another inclined surface of the prism array 39.

Figure 11:
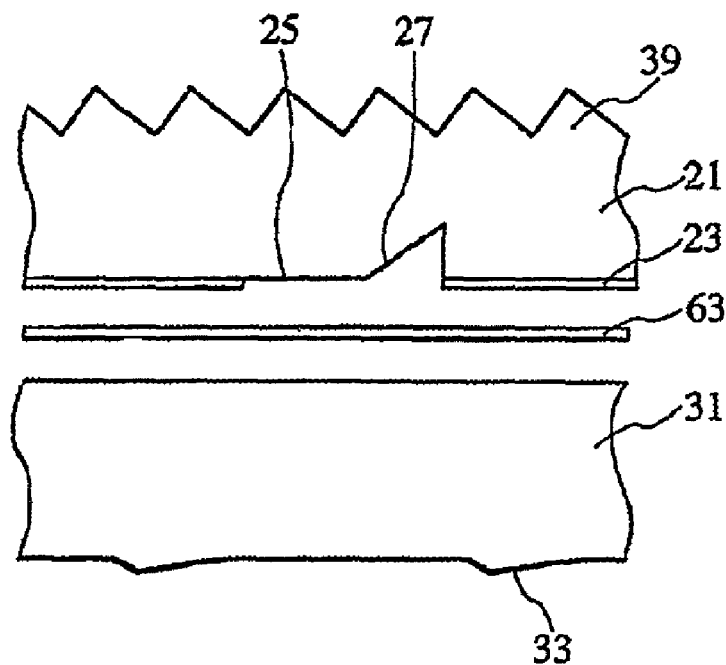
FIG. 11 is a diagram showing a method for forming the planar light emitting element according to the second embodiment.
Figure 12:
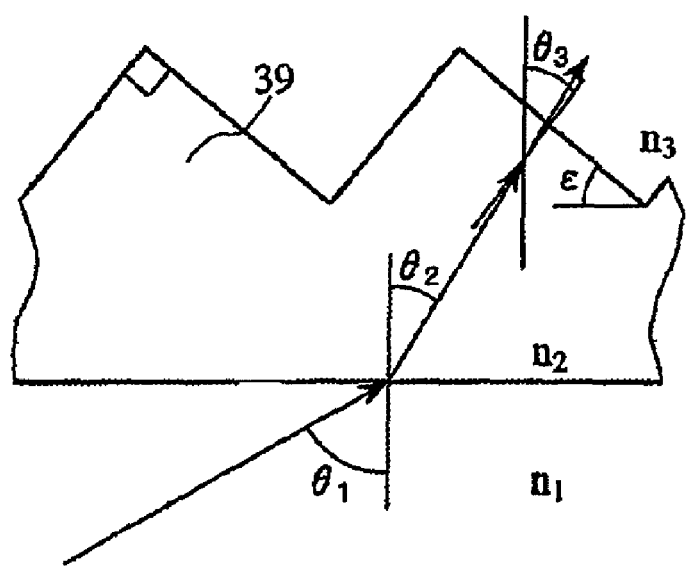
FIG. 12 is a diagram showing a prism sheet according to the second embodiment.

FIG. 11 is a diagram showing a method for forming the planar light emitting element according to the present embodiment. In the formation method, the light guide plate 31 and the first low refractive index layer 21 are separately formed by an injection molding process. In this case, the light guide plate 31 has the reflective groove 33, and the first low refractive index layer 21 has the reflective mirror 27 and the prism array 39. The second low refractive index layer 23 is formed by printing to be attached to the first low refractive index layer 21 while the second low refractive index layer 23 is aligned with the reflective mirror 27. After that, the light guide plate 31 and the first low refractive index layer 21 are attached to each other through the transparent adhesion layer 63. Light is transmitted from the light guide plate 31 through the transparent adhesion layer 63 to the first low refractive index layer 21 at the light output opening section 25. It is necessary that the transparent adhesion layer 63 have a refractive index equal to that of the light guide plate 31 or higher than that of the second low refractive index layer 23.

In the present embodiment, the reflective mirror 27 does not have a reflective layer to cause light to be totally reflected on the surface of the reflective mirror 27. The reflective mirror 27, however, may have a reflective layer formed thereon in the present embodiment. In this case, the reflective mirror 27 according to the second embodiment is essentially the same as the reflective mirror 27 provided with the reflective film 29 according to the first embodiment. The angle of the surface of the reflective mirror 27 having the reflective layer according to the second embodiment with respect to the light output surface of the light guide plate 31 may be set to reflect light toward the front direction. When the reflective mirror 27 is capable of reflecting light toward the front direction as described above, the prism array 39 and the prism sheet 41 are not necessary.

The prism array 39 may not be integrated with the first low refractive index layer 21 in the present embodiment. The light output surface of the first low refractive index layer 21 may be flat, and the prism array 39 and the first low refractive index layer 21 may be separately formed. In this case, the number of reflective surfaces is increased due to the addition of the interface while the first low refractive index layer 21 is capable of serving a part of the light guide plate 31. The shape of the prism array 39 in this case will be described with reference to FIG. 12.

When the refractive index of the prism array 39 is $n_2$; the refractive index of a medium on the incident side is $n_1$; the refractive index of a medium on the output side is $n_3$, an incident angle of light with respect to the Z direction is $\theta_1$; an output angle of light with respect to the Z direction is $\theta_3$; and an angle of the surface of the prism array 39 with respect to the Y direction is ∈, the following expressions (10) and (11) are established according to Snell's law.

$n_1 \sin\theta_1 = n_2 \sin\theta_2$  Expression (10)

$n_2 \sin(∈-\theta_2) = n_3 \sin(∈-\theta_3)$  Expression (11)

Under the condition that the angle ∈ is set ($\theta_3 \cong ∈$) to ensure that a main component of light is output in a direction substantially perpendicular to the inclined surface of the prism array 39, when light with a small spreading angle $\Delta\theta_1$ is incident on the prism array 39, the spreading angle $\Delta\theta_3$ of light output from the prism array 39 is represented by expression (12).

$$\Delta\theta_3 = \frac{n_1 n_3 \cos\theta_1}{\sqrt{n_2^2 - (n_1 \sin\theta_1)^2}} \Delta\theta_1 \quad \text{Expression (12)}$$

For example, when the media having respective refractive indexes $n_1$ and $n_3$ are atmospheres of air, the following expression is established: $\Delta\theta_3 < \Delta\theta_1$. This makes it clear that the prism array 39 provides an effect of improving the directivity of light. The larger the incident angle $\theta_1$ is, the larger the effect is. Also, the larger the refractive index $n_2$ of the prism array 39 is, the larger the effect is.

However, when the incident angle $\theta_1$ or the refractive index $n_2$ is increased, the amount of light reflected on the prism array 39 is increased. This results in a reduction in the amount of light to be transmitted through the prism array 39. It is therefore preferable that the incident angle $\theta_1$ and the refractive index $n_2$ of the prism array 39 be specified in consideration of the directivity of light and the reduction in the amount of light to be transmitted through the prism array 39. In this case, it is preferable that apex angle of the tip portion of the prism of the prism array 39 be close to 90 degrees to prevent light having a high luminance level from being blocked by another inclined surface of the prism array 39.

In the present embodiment, light is output from the prism array 39 in a direction oblique to the direction of the normal to the light output surface of the backlight 59 to obtain high directivity of the output light. The prism sheet 41 is adapted to direct the light output from the prism array 30 toward the front direction. The angle ∈ of an inclined surface of a prism of the prism sheet 41 with respect to the Z direction may be determined to ensure that the direction of light having the highest intensity and output from the prism sheet 41 is substantially parallel to the normal to the light output surface of the backlight 59 ($\theta_3 \cong 0$).

Since the light is incident on an incident surface of the prism sheet 41 from a direction oblique to the normal to the incident surface, reflectance of S-polarized light and reflectance of P-polarized light are different from each other on the incident surface of the prism sheet 41. Light output from the prism sheet 41 contains a larger amount of P-polarized light components than that of S-polarized light components. It is therefore preferable that the polarization direction of light to be polarized by the polarizing plate 7b is set based on the polarization direction of light output from the prism sheet 41. If the polarization direction of light to be polarized by the polarizing plate 7b cannot be set based on the polarization direction of light output from the prism sheet 41, the prism sheet 41 may have birefringence to cancel the polarization.

To prevent a moiré pattern from occurring between the prisms formed in the prism array 39 and the prism sheet 41 and the pixels of the liquid crystal display element, it is preferable that each of pitches of the prisms is reduced to ensure that two or more of the prisms are present within each of the pixels of the liquid crystal display element.

In the present embodiment, since it is not necessary that the reflective mirror 27 has the reflective film 29 formed thereon, the planar light emitting element (backlight 59) can be formed easily.

Next, a description will be made of a third embodiment of the present invention with reference to FIGS. 13 to 15.

Figure 13:
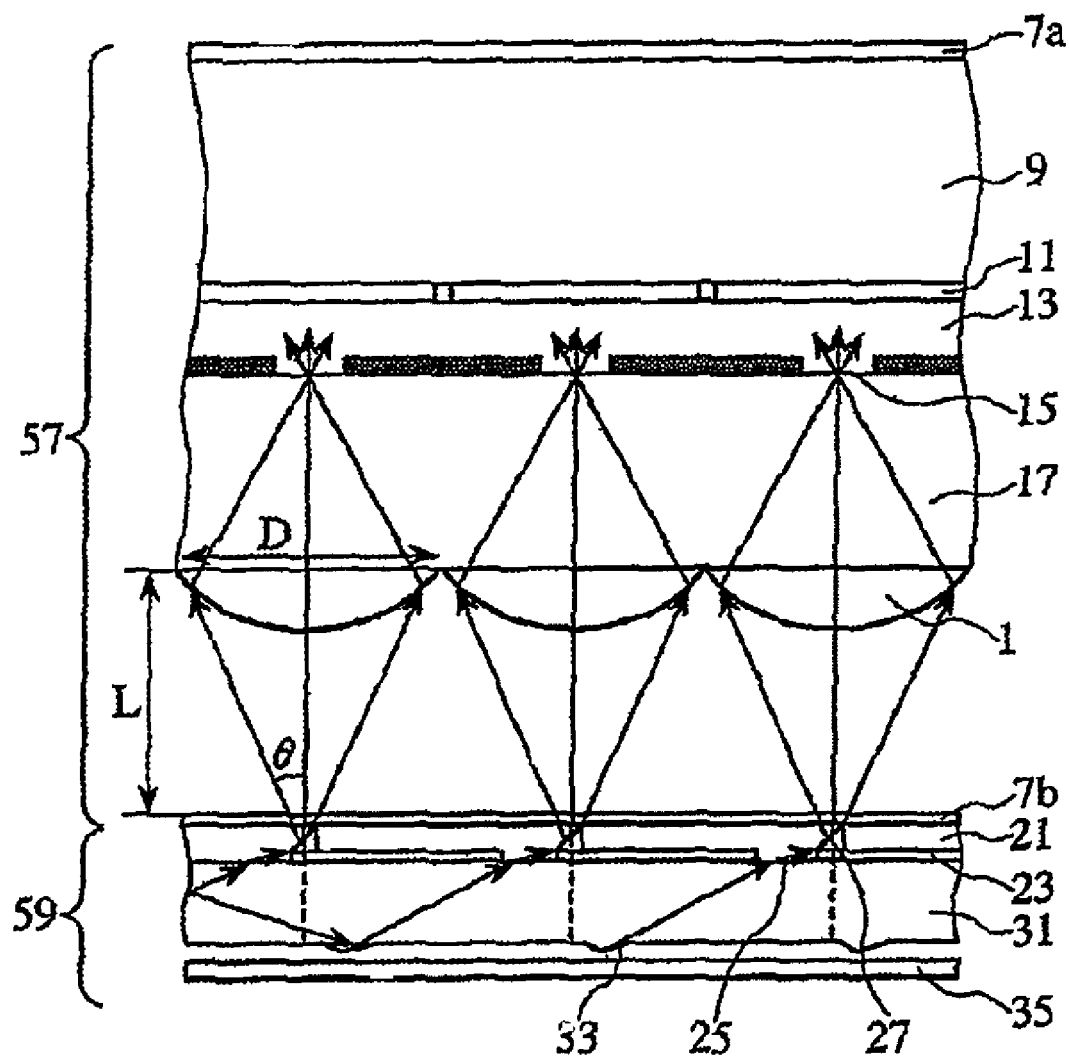
FIG. 13 is a cross sectional view of a planar light emitting element and an image display element according to a third embodiment of the present invention.

FIG. 13 is a cross sectional view of a planar light emitting element and an image display element according to the third embodiment. The image display element according to the third embodiment is different from the image display element according to the first embodiment in the position of the polarizing plate 7b. Other portions of the image display element according to the third embodiment are the same as those of the image display element according to the first embodiment. The planar light emitting element according to the third embodiment is different from the planar light emitting element according to the first embodiment in the position of the light output opening section 25 and the position of the reflective mirror 27. The planar light emitting element according to the third embodiment does not have the diffusion sheet 19. Other portions of the planar light emitting element according to the third embodiment are the same as those of the planar light emitting element according to the first embodiment. In the present embodiment, the reflective mirror 27 is aligned with the pixel of the liquid crystal display element (image display element) 57. The reflective mirror 27 is aligned with the lenticular lens 1. Light reflected on the reflective mirror 27 is incident on the lenticular lens 1. The lenticular lens 1 focuses the light on the transmission opening section 15. The light can be efficiently transmitted through the transmission opening section 15. The polarizing plate 7b is provided between the first low refractive index layer 21 and the lower substrate 17. In the present embodiment, the polarizing plate 7b is attached to the first low refractive index layer 21 to reduce the number of interfaces which are in contact with air.

The larger the gap between the lenticular lens 1 and the reflective mirror 27 is, the larger the radius of curvature of the lenticular lens 1 can be. It is preferable that the gap between the lenticular lens 1 and the reflective mirror 27 be large since the lenticular lens 1 can be easily formed. To efficiently cause light to be incident on the lenticular lens 1 even when the gap between the lenticular lens 1 and the reflective mirror 27 is large, it is preferable that a spreading angle θ (shown in FIG. 13) of light output from the backlight 59 be small. In addition, it is preferable that the spreading angle θ of the light satisfy expression (13), where D is the width (measured in a direction parallel to the light output surface of the backlight 59) of the lenticular lens 1, and L is the gap between the lenticular lens 1 and the reflective mirror 27.

$$\theta < \tan^{-1}\left(\frac{D}{2L}\right)$$ Expression (13)

When the image display device has a small thickness, it is preferable that the gap between the lenticular lens 1 and the reflective mirror 27 be reduced.

Figure 14:
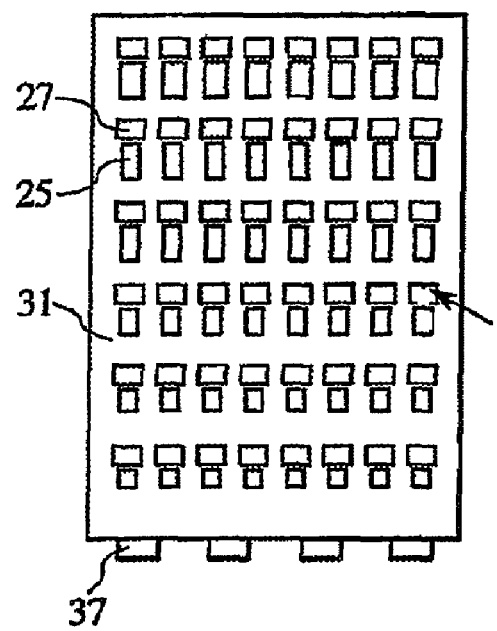
FIG. 14 is a front view of the planar light emitting element according to the third embodiment.

FIG. 14 is a front view of the backlight 59 according to the third embodiment. In FIG. 14, the light output opening sections 25 and the reflective mirrors 27 are repeatedly arranged to be aligned with the respective transmission opening sections 15 at a regular interval. The closer to the side of the LEDs the light output opening section 25 is, the smaller the area of the light output opening section 25 is. On the other hand, the more distant from the side of the LEDs the light output opening section 25 is, the larger the area of the light output opening section 25 is. This prevents the luminance level of light output from the backlight 59 from being gradually reduced from the side of the LEDs to the side opposite to the LEDs. The amount of the light output from the backlight 59 can be controlled by adjusting the shapes of the light output opening sections 25 in the abovementioned way. In addition, the amount of the light output from the backlight 59 can be controlled by adjusting the height and width of each of the reflective mirrors 27.

Figure 15:
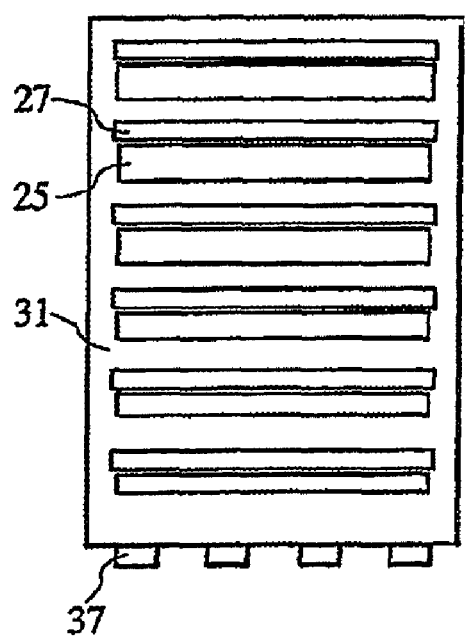
FIG. 15 is a front view of another planar light emitting element according to the third embodiment.

FIG. 15 is a front view of another type of the backlight 59. In this type of the backlight 59, the light output opening sections 25 arranged in a direction in which the lenticular lens 1 does not have the focusing property, i.e., the direction in which the sub-pixels are arranged, are integrated with each other, and the reflective mirrors 27 arranged in the direction in which the lenticular lens 1 does not have the focusing property are integrated with each other. Alternatively, the backlight 59 may be configured to ensure that the light output opening sections 25 are separated from each other in the abovementioned direction to be aligned with the respective sub-pixels while the reflective mirrors 27 arranged in the direction are integrated with each other.

In the present embodiment, since the reflective mirror 27 is aligned with the pixel, the number of the reflective mirrors 27 can be reduced. The backlight 59 can be therefore formed easily. In the present embodiment, when the width and height of the lenticular lens 1 are randomly changed and the curvature of the lenticular lens 1 is maintained, luminance levels of light output from the backlight 59 remain substantially constant. The configuration according to the present embodiment is therefore desirable.

In the present embodiment, when a light reflection point on the reflective mirror 27 is aligned with the focal position of the lenticular lens 1 in the Z direction (parallel to the normal to the light output surface of the backlight 59), light having high directivity in a single direction can be obtained. In this way, the planar light emitting element may be combined with the lenticular lens 1 to output light having high directivity in a single direction. In this case, a separate lenticular lens may be provided on the side of the image display element to focus the light on the transmission opening section 15.

Next, a description will be made of a fourth embodiment of the present invention with reference to FIG. 16.

Figure 16:
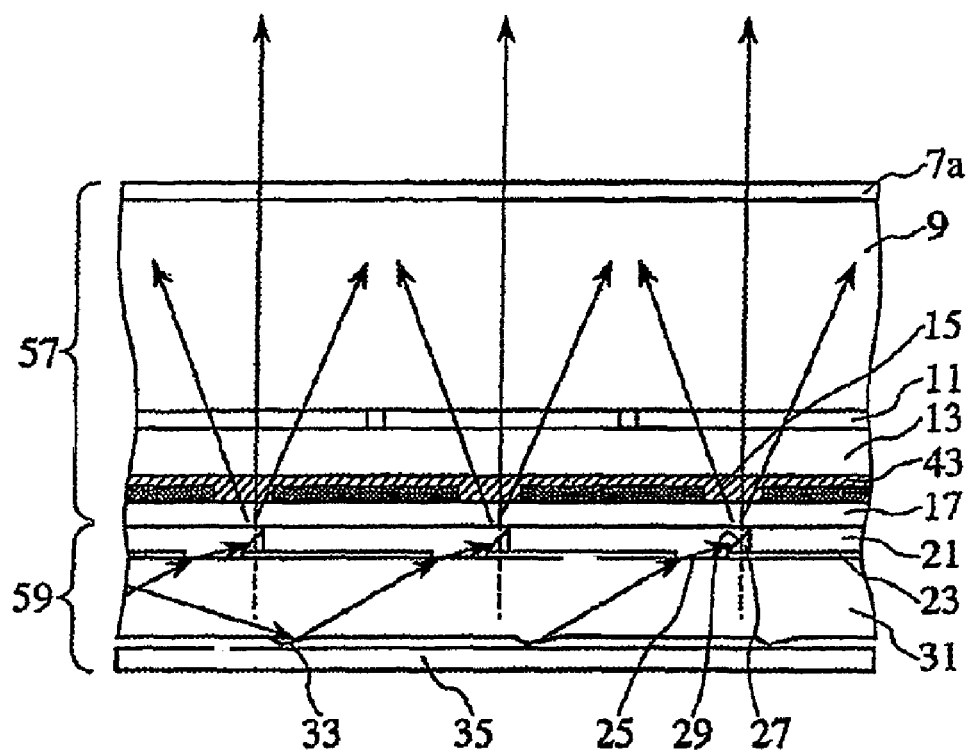
FIG. 16 is a cross sectional view of a planar light emitting element and an image display element according to a fourth embodiment of the present invention.

FIG. 16 is a cross sectional view of a planar light emitting element and an image display element according to the fourth embodiment. The planar light emitting element according to the fourth embodiment is the same as the planar light emitting element according to the third embodiment. In the image display element according to the fourth embodiment, the lower substrate 17 of transflective LCD has a smaller thickness (compared with that of the lower substrate 17 according to the first to third embodiments). The thickness of the lower substrate 17 is smaller than that of the upper substrate 9. In the fourth embodiment, the liquid crystal display element (image display element) 57 is attached to the backlight 59 without using the lenticular lens 1 (serving as the light focusing element) described in the first to third embodiments.

Light incident on the light guide plate 31 from a light source (not shown) is totally reflected on the interface between the light guide plate 31 and the second low refractive index layer 23 and propagates in the light guide plate 31. The light guide plate 31 is in contact with the first low refractive index layer 21 at the light output opening section 25. The light is output from the light guide plate 31 through the light output opening section 25 to the liquid crystal display element 57. A pair of the light output opening section 25 and the reflective mirror 27 is in a one-to-one relationship with the transmission opening section 15 as shown in FIG. 16. Light transmitted through the light output opening section 25 is reflected on the reflective film 29 of the reflective mirror 27 and incident on the transmission opening section 15.

In the present embodiment, one of the pair of polarizing plates, the polarizing plate 7a (the first polarizing plate) is provided on the side opposite to the liquid crystal layer 13 with respect to the upper substrate 9. The other polarizing plate, an in-cell polarizing plate 43 (the second polarizing plate) is provided between the lower substrate 17 and the liquid crystal layer 13 and in contact with the liquid crystal layer 13. The in-cell polarizing plate 43 receives light reflected on the reflective mirror 27 and polarizes the light. The liquid crystal layer 13 changes the polarization direction of the polarized light. Then, the liquid crystal display element 57 displays an image. The reflective mirror 27 and the transmission opening section 15 are arranged closely to each other (the lower substrate 17 and the first low refractive index layer 21 are arranged closely to each other) to improve the directivity of light output from the backlight 59. This results in an increase in the effective amount of light transmitted through the transmission opening section 15.

In the present embodiment, a large amount of light transmitted through the transmission opening section 15 can be obtained without using the micro lens array. This can simplify the configuration of the image display device and reduce the thickness of the image display device. The shape of each of the light output opening sections 25, the shape of each of the reflective mirrors 27, the shape of each of the reflective grooves 33, and the interval of the reflective grooves 33 can be adjusted to maintain the amounts of light transmitted through the transmission opening sections 15 to be constant.

In the present embodiment, the reflective mirror 27 and the transmission opening section 15 are arranged closely to each other, and the in-cell polarizing plate 43 is provided, in order to increase the amount of light transmitted through the transmission opening section 15. A polarizing plate may be provided between the lower substrate 17 and the first low refractive index layer 21 in addition to or in place of the in-cell polarizing plate 43. The liquid crystal display element 57 may be provided on the first low refractive index layer 21 without the lower substrate 17. In this case, when the liquid crystal display element 57 is an active matrix type, it is preferable that a TFT be formed by a transfer method or be an organic TFT using an organic semiconductor material.

In addition, the transmission opening section 15 may be large (similarly to a sixth embodiment of the present invention described later) and a reflective film may be provided on the second low refractive index layer 23. The reflective film is capable of reflecting light input from the transmission opening section 15 to allow the light to be used for the display. A transmissive liquid crystal display element may be used to display an image by means of micro-reflection.

Next, a description will be made of a fifth embodiment of the present invention with reference to FIGS. 17 and 18.

Figure 17:
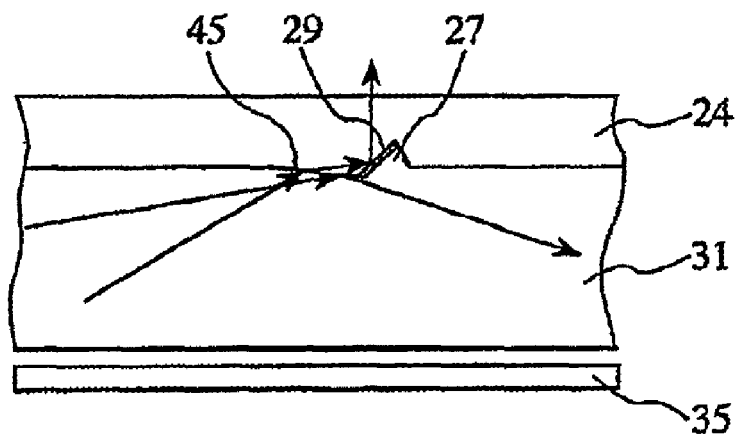
FIG. 17 is a cross sectional view of a planar light emitting element according to a fifth embodiment of the present invention.

FIG. 17 is a cross sectional view of a planar light emitting element according to the fifth embodiment. In the present embodiment, a low refractive index layer 24 is provided on the side of the light output surface of the light guide plate 31. Light is totally reflected on the interface between the light guide plate 31 and the low refractive index layer 24 and propagates in the light guide plate 31. The light is output from the light guide plate 31 through a light output inclined section 45 to the low refractive index layer 24. The light output inclined section 45 has an inclined groove formed at the interface between the light guide plate 31 and the low refractive index layer 24 (the light output inclined section 45 is provided in the light guide plate 31 and provided on the side of the low refractive index layer 24). Light is incident on the light output inclined section 45 at a larger incident angle than that of light incident on other portions of the interface between the light guide plate 31 and the low refractive index layer 24 and output from the light guide plate 31 to the low refractive index layer 24. In this case, the incident angle is measured with respect to the other portions of the interface between the light guide plate 31 and the low refractive index layer 24.

The reflective mirror 27 may have the reflective film 29 thereon to allow the light to be efficiently output from the backlight 59. The reflective film 29 is formed of metal having high reflectance such as silver and aluminum or of a dielectric multi-layer film. The light transmitted from the light guide plate 31 through the light output inclined section 45 and the low refractive index layer 24 is reflected on the reflective mirror 27 and output to the first low refractive index layer 21.

Figure 18:
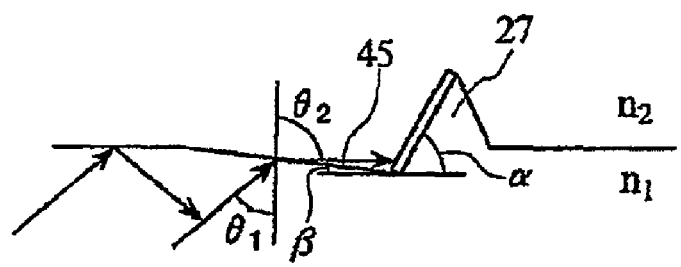
FIG. 18 is a cross sectional view of a light output inclined section and a reflective mirror according to the fifth embodiment.

FIG. 18 is an enlarged view of the light output inclined section 45 and the reflective mirror 27. After the light is totally reflected on the interface between the light guide plate 31 and the second low refractive index layer 23 and propagates in the light guide plate 31, the light is incident on the interface between the light guide plate 31 and the second low refractive index layer 23 at an incident angle $\theta_1$ (with respect to the normal to the other portions of the interface between the light guide plate 31 and the low refractive index layer 24). In this case, the incident angle $\theta_1$ satisfies expression (14) ($n_1 > n_2$), where $n_1$ is the refractive index of the light guide plate 31, and $n_2$ is the refractive index of the low refractive index layer 24.

$$\theta_1 > \sin^{-1}\left(\frac{n_2}{n_1}\right) \qquad \text{Expression (14)}$$

When the refractive index $n_2$ is sufficiently smaller than the refractive index $n_1$, an angle of the direction of light propagating in the light guide plate 31 with respect to the light output surface of the light guide plate 31 is large. Among light incident on the light output inclined section 45, light satisfying expression (15) is output from the light guide plate 31 to the low refractive index layer 24.

$$\sin^{-1}\left(\frac{n_2}{n_1}\right) + \beta > \theta_1 > \sin^{-1}\left(\frac{n_2}{n_1}\right) \qquad \text{Expression (15)}$$

In this case, the output angle $\theta_2$ of the direction of light output from the light output inclined section 45 with respect to the normal to the other portions of the interface between the light guide plate 31 and the low refractive index layer 24 is represented by expression (16), where $\beta$ is an angle of the surface of the light output inclined section 45 with respect to the light output surface of the light guide plate 31 (excluding the light output inclined section 45).

$$90° + \beta > \theta_2 > \sin^{-1}\left(\frac{n_2}{n_1}\sin\left(\sin^{-1}\left(\frac{n_2}{n_1}\right) - \beta\right)\right) + \beta \qquad \text{Expression (16)}$$

For example, when transparent polymer having a refractive index of 1.59 is used as the light guide plate 31, and transparent polymer having a refractive index of 1.34 is used as the first low refractive index layer 21, light incident on the interface between the light guide plate 31 and the second low refractive index layer 23 at the incident angle $\theta_1$ of more than 32.6 degrees is totally reflected on the interface between the light guide plate 31 and the second low refractive index layer 23 and propagates in the light guide plate 31. When the angle $\beta$ is 0.75 degrees, the output angle $\theta_2$ is more than 83.3 degrees and less than 90.75 degrees. This makes it possible to set the spreading angle of light output from the low refractive index layer 24 to ±5 degrees. In this case, when an angle $\alpha$ of the surface of the reflective mirror 27 with respect to the light output surface of the light guide plate 31 (excluding the light output inclined section 45) is 43.5 degrees, the reflective mirror 27 can reflect the light toward the front direction (the Z direction).

It is preferable that the angle $\beta$ of the surface of the light output inclined section 45 with respect to the other portions of the interface between the light guide plate 31 and the low refractive index layer 24 be small. To set the spreading angle of light output from the backlight 59 to ±7 degrees or less, it is necessary that the angle $\beta$ be in a range from 0 degrees to 1 degree. To set the spreading angle of light output from the backlight 59 to ±5 degrees or less, it is necessary that the angle $\beta$ be in a range from 0 degrees to 0.75 degrees.

When the incident angle $\theta_1$ is large, the propagation angle of light reflected on the light output inclined section 45 is a value of (90 degrees $-\theta_1 + \alpha_2$). Therefore, a reflective groove is not provided in the light guide plate 31 and on the side opposite to the low refractive index layer 24. The surface of the light guide plate 31, which is located on the side opposite to the low refractive index layer 24, is flat. After the light output inclined 45 and the reflective film 29 (located on the reflective mirror 27) are formed, the first low refractive index layer 21 is coated and cured.

The planar light emitting element according to the present embodiment has a simple structure and can be formed easily. In addition, the planar light emitting elements according to the first, third and fourth embodiments may be replaced with the planar light emitting element according to the fifth embodiment. The light output opening section 25 of each of the planar light emitting elements according to the first, third and fourth embodiments may be inclined with respect to the light output surface of the light guide plate 31.

Next, a description will be made of a sixth embodiment of the present invention with reference to FIG. 19.

Figure 19:
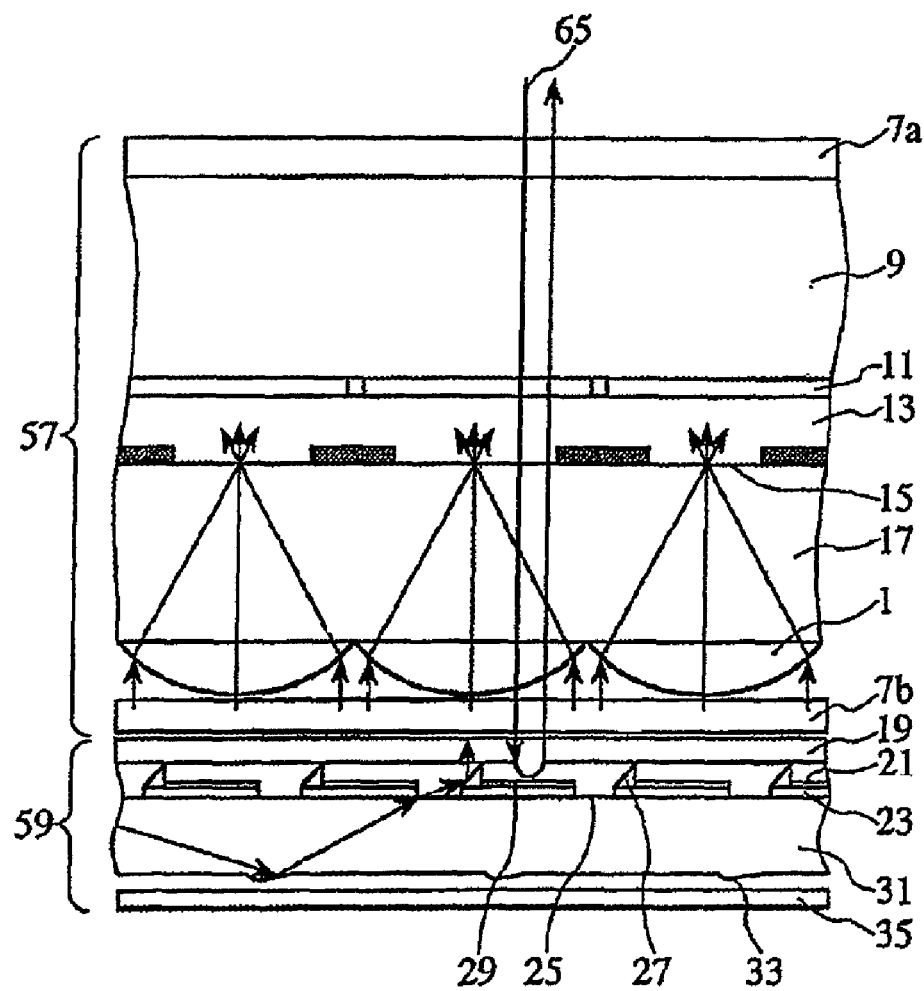
FIG. 19 is a cross sectional view of a planar light emitting element and an image display element according to a sixth embodiment of the present invention.

FIG. 19 is a cross sectional view of a planar light emitting element and an image display element according to the sixth embodiment. In the sixth embodiment, a transmissive type of the liquid crystal display element 57 is used as the image display element, and the reflective film 29 is provided on the surface (located on the side of the liquid crystal display element 57) of the second low refractive index layer 23. Other portions of the planar light emitting element (backlight 59) according to the sixth embodiment are the same as those of the planar light emitting element according to the first embodiment. The second low refractive index layer 23 has a concavo-convex surface to diffusely reflect light. Light transmitted through the light output opening section 25 is reflected on the reflective mirror 27 in the same manner as that in the first embodiment. The reflected light is focused by the lenticular lens 1 on the transmission opening section 15 and then output from the liquid crystal display element 57.

Light 65 (shown in FIG. 19) coming from the liquid crystal display element 57 and transmitted through the transmission opening section 15 is reflected on the reflective film 29 provided on the second low refractive index layer 23. The reflected light is then retransmitted through the transmission opening section 15 to be reused for the display. The image display device may have a micro-reflection structure since the light 65 is reflected on the reflective film 29 and used for display. Even when the light 65 coming from the liquid crystal display element 57 has a high intensity, an image can be displayed. The light propagating in the light guide plate 31 is totally reflected on the interface between the light guide plate 31 and the low refractive index layer 24. Thus, even when the reflective film 29 made of metal is provided on the low refractive index layer 24, the light can propagates in the light guide plate 31 without a loss of the light.

Next, a description will be made of a seventh embodiment of the present invention with reference to FIG. 20.

Figure 20:
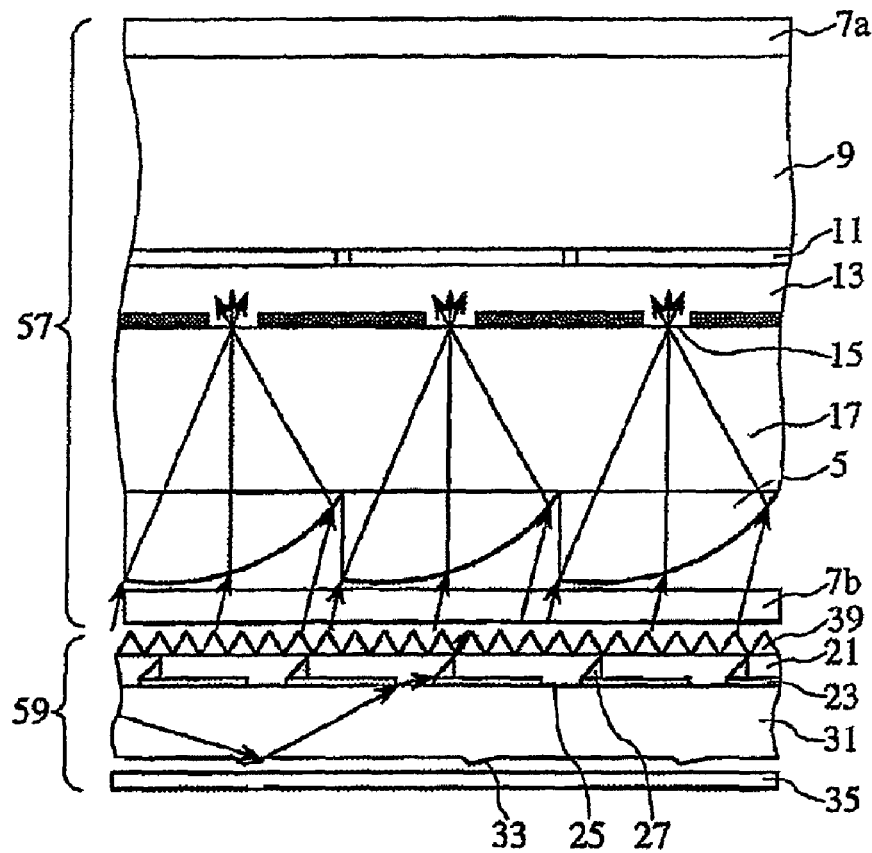
FIG. 20 is a cross sectional view of a planar light emitting element and an image display element according to a seventh embodiment of the present invention.

FIG. 20 is a cross sectional view of a planar light emitting element and an image display element according to the seventh embodiment. The planar light emitting element (backlight 59) according to the seventh embodiment is different from the planar light emitting element according to the second embodiment in that the backlight 59 according to the seventh embodiment does not include the prism sheet 41. The image display element (liquid crystal display element 57) according to the seventh embodiment is different from the image display element according to the second embodiment in that the liquid crystal display element 57 according to the seventh embodiment includes an asymmetric lenticular lens 5 as the light focusing element. Since the prism sheet 41 is not provided, light is output from the backlight 59 in a direction oblique to the normal to the light output surface of the backlight 59. The asymmetric lenticular lens 5, therefore, focuses the light output from the backlight 59 and having high directivity on the transmission opening section 15 and changes the direction of propagation of the light to ensure that a luminance level of light propagating in the front direction is high. Light incident on the asymmetric lenticular lens 5 from the direction oblique to the normal to the light output surface of the backlight 59 can be directed toward the front direction by positioning the transmission opening section 15 and the asymmetric lenticular lens 5 to ensure that the position of the center of the transmission opening section 15 and the position of the center (of an upper surface) of the asymmetric lenticular lens 5 are different from each other in the Z direction (the front direction).

It is preferable that the asymmetric lenticular lens 5 according to the present embodiment be an aspherical lens, and formed into a shape obtained by removing a half of a lens. In addition, it is preferable that the aspherical lens be represented by a polynomial containing an odd term.

In the present embodiment, since the prism sheet 41 is not provided (the prism sheet 41 is provided in the second embodiment), a loss of light due to the prism sheet 41 can be reduced.

Next, a description will be made of an eighth embodiment of the present invention with reference to FIGS. 21 to 23.

Figure 21:
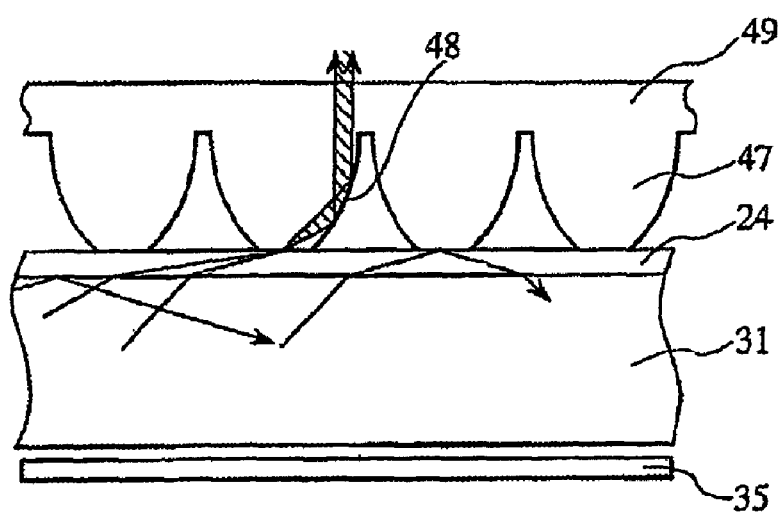
FIG. 21 is a cross sectional view of a planar light emitting element according to an eighth embodiment of the present invention.

FIG. 21 is a cross sectional view of a planar light emitting element according to the eighth embodiment. Light incident on the light guide plate 31 from a light source (not shown) is mostly reflected multiple times within the light guide plate 31. The low refractive index layer 24 is provided on the side of the liquid crystal display element 57 with respect to the light guide plate 31 (and on the side of the light output surface of the light guide plate 31). Light is totally reflected on the interface between the light guide plate 31 and the low refractive index layer 24 and propagates in the light guide plate 31. In addition, light is totally reflected on the surface (located on the side of the liquid crystal display element 57) of the low refractive index layer 24 and propagates in the low refractive index layer 24.

A protruding sheet 49 having a protrusion 47 is provided to allow the light to be output from the light guide plate 31 to the side of the liquid crystal display element 57. The protruding sheet 49 is a reflective member. The protrusion 47 is a reflective surface. A tip portion of the protrusion 47 is in contact with the first low refractive index layer 24. The protruding sheet 49 is provided on the side of a light output surface (located on the side opposite to the light guide plate 31) of the low refractive index layer 24. The protrusion 47 is adapted to reflect light output from the light guide plate 31 through the low refractive index layer 24. The protrusion 47 has a protrusion side surface 48. The light incident on the protrusion 47 is totally reflected on the protrusion side surface 48 and output from the protruding sheet 49. In this case, when the refractive index of the light guide plate 31 is $n_1$; the refractive index of the low refractive index layer 24 is $n_2$; and the refractive index of the protruding sheet 49 is $n_3$, the following expression (17) is established.

$$n_3 \geq n_1 > n_2 \qquad \text{Expression (17)}$$

When a propagation angle of the direction of light propagating in the light guide plate 31 with respect to the light output surface of the light guide plate 31 is $\phi$, light propagating at a small propagation angle $\phi$ is totally reflected on the interface between the light guide plate 31 and the low refractive index layer 24 only light propagating at a large propagation angle $\phi$ is transmitted through the low refractive index layer 24 and incident on the protrusion 47. Light, which is incident on the low refractive index layer 24 and is not incident on the protrusion 47, is totally reflected on the light output surface of the low refractive index layer 24 and is returned into the light guide plate 31.

Figure 22:
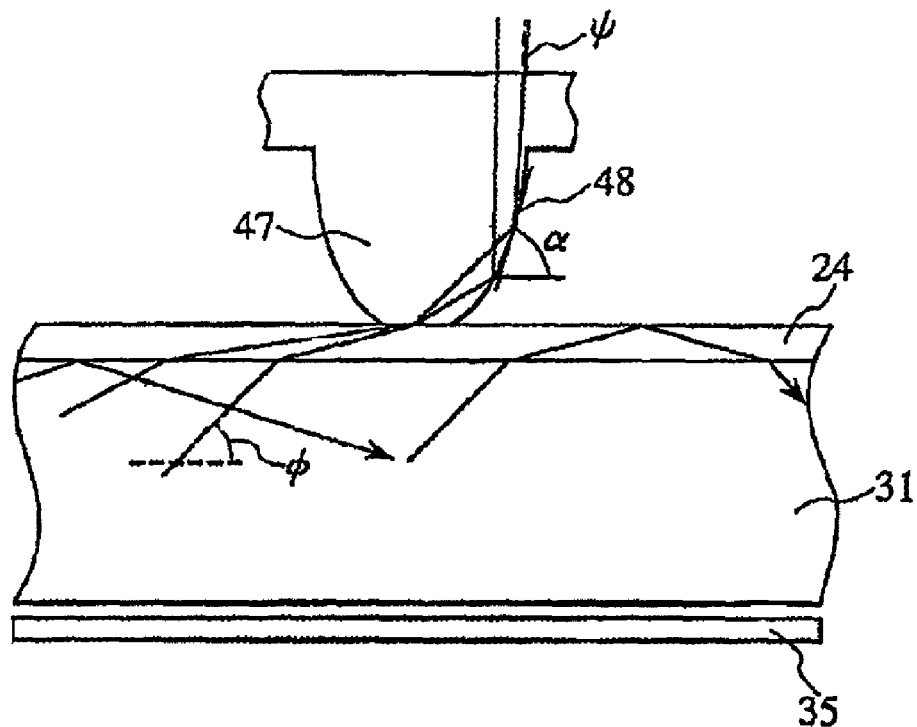
FIG. 22 is a cross sectional view of a protrusion according to the eighth embodiment.

FIG. 22 is an enlarged cross sectional view of the protrusion 47. When light propagating in the light guide plate 31 at a propagation angle $\phi$ (of the direction of propagation of the light with respect to the light output surface of the light guide plate 31) is not totally reflected on the interface between the light guide plate 31 and the low refractive index layer 24 and is incident on the low refractive index layer 24, it is necessary that the propagation angle $\phi$ satisfy expression (18).

$$\phi > 90° - \sin^{-1}\left(\frac{n_2}{n_1}\right) \qquad \text{Expression (18)}$$

When the light propagating in the light guide plate 31 at a propagation angle $\phi$ is totally reflected on the interface between the low refractive index layer 24 and an atmosphere of air, it is necessary that the propagation angle $\phi$ satisfy expression (19).

$$\phi < 90° - \sin^{-1}\left(\frac{1}{n_1}\right) \qquad \text{Expression (19)}$$

An angle $\psi$ of the direction of propagation of light output from the protruding sheet 49 with respect to the normal to the light output surface of the light guide plate 31 is represented by expression (20), where $\alpha$ is an angle of the protrusion side surface 48 located at a point on which the light is reflected with respect to the light output surface of the light guide plate 31.

$$\psi = \sin^{-1}\left(n_3 \sin\left(2\alpha + \sin^{-1}\left(\frac{n_1}{n_3}\cos\phi\right)\right)\right) \qquad \text{Expression (20)}$$

The range (indicated by diagonal lines shown in FIG. 21) of the angles of light transmitted through the protrusion 47 can be controlled by adjusting the refractive index of the low refractive index layer 24 as apparent from the abovementioned expressions.

As a result, the spreading angle of the light output from the protruding sheet 49 can be reduced and the directivity of the light can be improved. To improve the directivity of light, it is preferable that the refractive index of the protrusion 47 be large and the refractive index of the low refractive index layer 24 be small. It is therefore desirable that a material having a low refractive index such as fluorinated polymer be used for the low refractive index layer 24 and a material having a high refractive index of 1.7 or more be used for the protrusion 47. The material having a high refractive index can be achieved by mixing polymer and microscopic particles of an inorganic material having a high refractive index such as $TiO_2$.

To improve the directivity of light output from the protruding sheet 49, it is preferable that a cross section of the protrusion 47 be parabolic and the position of the focal point of the parabola coincides with the position of the center of the tip of the protrusion 47. When the position of the focal point of the parabola coincides with the position of the center of the tip of the protrusion 47, light reflected on the protrusion side surface 48 is focused to obtain high directivity. The directivity of the light, therefore, can be improved by both the limitation of the range of the angles of the light transmitted through the protrusion 47 due to the adjustment of the refractive index of the low refractive index layer 24 and the focusing of the light by means of the protrusion side surface 48.

Figure 23:
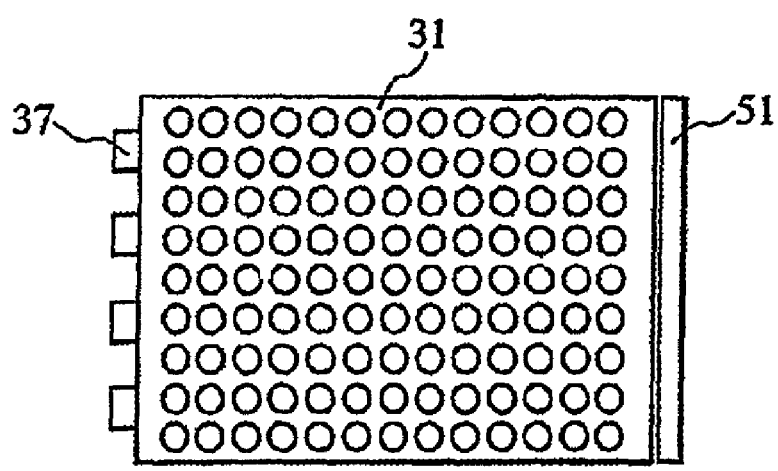
FIG. 23 is a front view of the planar light emitting element according to the eighth embodiment.

FIG. 23 is a front view of the backlight 59 according to the eighth embodiment. In the backlight 59 shown in FIG. 23, the protrusion 47 has a circular cross section to reflect light in the same way regardless of the incident direction of the light and output the light with high directivity. A reflective return plate 51 is provided on the side of a side surface of the light guide plate 31 and on the side opposite to the incident surface of the light guide plate 31. The LED 37 is provided on the side of the incident surface of the light guide plate 31. Light reflected on the reflective return plate 51 and returned to the light guide plate 31 is incident on the protrusion 47 in the same way and output from the protruding sheet 49 with high directivity.

In the above description, the LED is used as the light source. A linear light source such as a cold cathode fluorescent lamp may be used as the light source. Since the backlight 59 is capable of outputting light having high directivity in all the directions, a spherical lens array may be applied to the image display device, in addition to the lenticular lens. The lenticular lens can effectively function when light has high directivity in one direction. Therefore, when the lenticular lens is used, it is not necessary that the protrusions 47 are separated from each other. The protrusions 47 arranged in a longitudinal direction of the lenticular lens may be integrated with each other.

Next, a description will be made of a ninth embodiment of the present invention with reference to FIG. 24.

Figure 24:
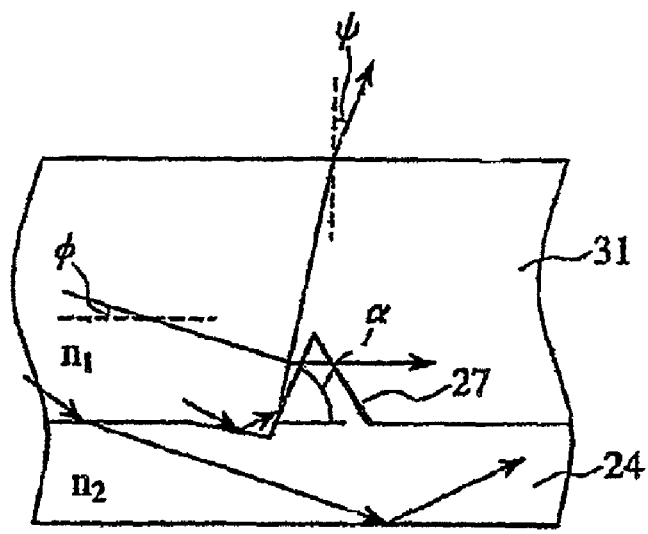
FIG. 24 is a cross sectional view of a planar light emitting element according to a ninth embodiment of the present invention.

FIG. 24 is a cross sectional view of a planar light emitting element according to the ninth embodiment. Light incident on the light guide plate 31 from a light source (not shown) is mostly reflected multiple times within the light guide plate 31. The low refractive index layer 24 is provided on the side opposite to the liquid crystal display element 57 with respect to the light guide plate 31. The light is totally reflected on the interface between the low refractive index layer 24 and an atmosphere of air and propagates in the light guide plate 31 and the low refractive index layer 24. The reflective mirror 27 is provided on the side opposite to the light output surface of the light guide plate 31 to output the light totally reflected on the reflective mirror 27 from the light guide plate 31 to the side of the liquid crystal display element 57. In order to allow the refractive mirror 27 to totally reflect the light, the light guide plate 31 and the low refractive index layer 24 are provided to ensure that expression (21) is established, where $n_1$ is the refractive index of the light guide plate 31, and $n_2$ is the refractive index of the low refractive index layer 24.

$$n_1 > n_2 \qquad \text{Expression (21)}$$

Light propagating in the light guide plate 31 at a propagation angle $\phi$ (of the direction of propagation of the light with respect to the light output surface of the light guide plate 31) is totally reflected on the reflective mirror 27 only when the propagation angle $\phi$ satisfies expression (22), where $\alpha$ is an angle of a reflective surface of the reflective mirror 27 with respect to the light output surface of the light guide plate 31.

$$\phi > \sin^{-1}\left(\frac{n_2}{n_1}\right) - 90° + \alpha \qquad \text{Expression (22)}$$

The light propagating in the light guide plate 31 at a propagation angle $\phi$ (of the direction of propagation of the light with respect to the light output surface of the light guide plate 31) is reflected and propagates in the light guide plate 31 only when the propagation angle $\phi$ satisfies expression (23).

$$\phi < 90° - \sin^{-1}\left(\frac{1}{n_1}\right) \quad \text{Expression (23)}$$

An angle ψ of the direction of propagation of light output from the light guide plate 31 with respect to the normal to the light output surface of the light guide plate 31 is represented by expression (24).

$$\psi = \sin^{-1}(n_1 \cos(2\alpha - \phi)) \quad \text{Expression (24)}$$

Based on expressions (22) to (24), it is preferable that the refractive index of the light guide plate 31 be small, and the refractive index of the low refractive index layer 24 be close to the refractive index of the light guide plate 31, in order to improve the directivity of the light output from the light guide plate 31.

The angle α of the reflective surface of the reflective mirror 27 is preferably set to ensure that light totally reflected on the reflective mirror 27 is directed toward the front direction (Z direction). For example, when the refractive index $n_1$ of the light guide plate 31 is 1.49; the refractive index $n_2$ of the low refractive index layer 24 is 1.35; and the angle α is 67.6 degrees, the spreading angle ψ of the direction of propagation of light output from the light guide plate 31 with respect to the normal to the light output surface of the light guide plate 31 is ±3.9 degrees. It is apparent that the light has high directivity. Based on expressions (22) to (24), the spreading angle of the light output from the light guide plate 31 is ±7 degrees or less only when the following expression is established: $0 < n_1 - n_2 \leq 0.17$. In addition, the spreading angle of the light output from the light guide plate 31 is ±5 degrees or less only when the following expression is established: $0 < n_1 - n_2 \leq 0.15$. The refractive index $n_1$ of the light guide plate 31 is preferably more than 1 and not larger than 1.7, more preferably not larger than 1.5, and the angle α of the reflective surface of the reflective mirror 27 is preferably 67 degrees or more.

The luminance level of the light output from the light guide plate 31 can be controlled by adjusting the height and width of each of the reflective mirrors 27 and the number of the reflective mirrors 27. In addition, when the total of the thicknesses (measured in the Z direction) of the light guide plate 31 and the low refractive index layer 24 is reduced, the amount of light output from the light guide plate 31 per unit length is increased.

In the present embodiment, the refractive index of the light guide plate 31 is preferably small. Since light is output from the light guide plate 31 at a portion having a small refractive index, an increase in the spreading angle of the light output from the light guide plate 31 can be suppressed.

The low refractive index layer 24 may be formed by coating and curing the low refractive index layer 24 on the light guide plate 31 which is formed by an injection molding process to form the reflective mirror 27. Alternatively, the low refractive index layer 24 and the light guide plate 31 may be simultaneously formed by a co-injection molding process.

Next, a description will be made of a tenth embodiment of the present invention with reference to FIGS. 25 to 28.

Figure 25:
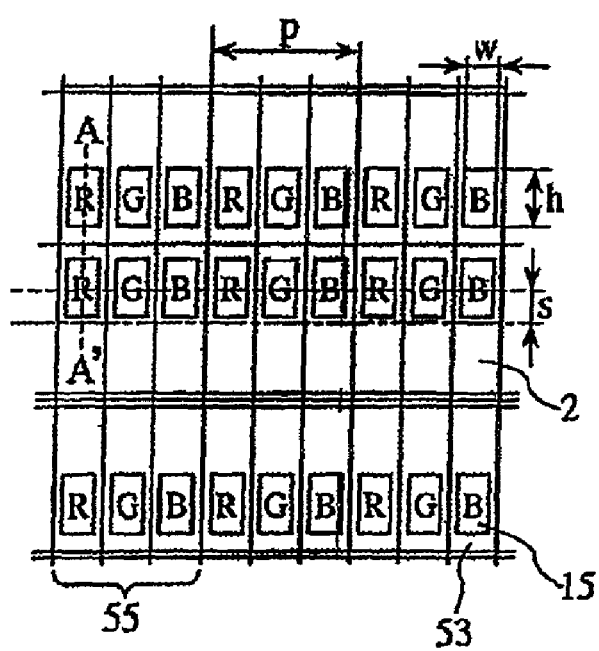
FIG. 25 is a front view of the arrangement of pixels of an image display element according to a tenth embodiment of the present invention.
Figure 26:
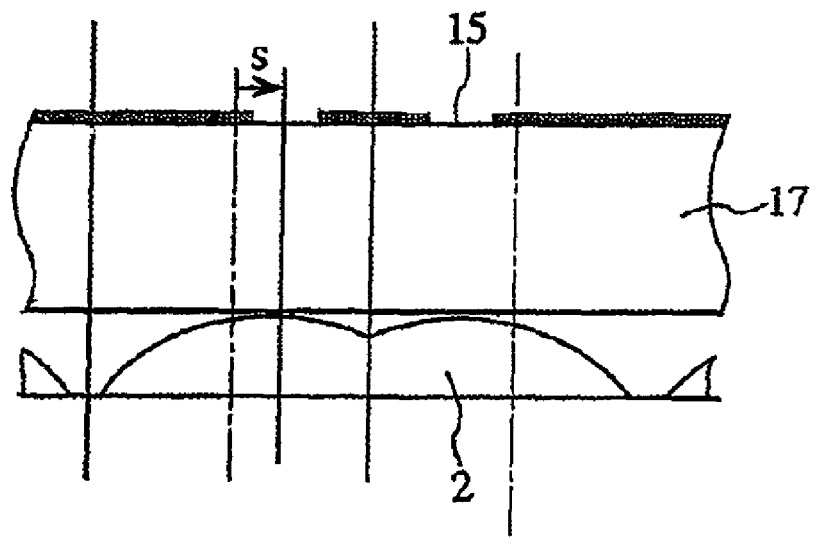
FIG. 26 is a cross sectional view of the pixels taken along line A-A' of FIG. 25.

FIG. 25 is a front view of the arrangement of pixels of an image display element according to the tenth embodiment. FIG. 26 is a cross sectional view of the pixels taken along line A-A' of FIG. 25.

When a micro lens array is used to focus light having high directivity on the transmission opening section 15, the luminance level and the viewing angle of the image display element are determined substantially by the width and the focusing point of the lens included in the micro lens array. In order to increase the amount of light output from the transmission opening section 15, the lens is adjusted to ensure that the focusing point of the lens is positioned at the transmission opening section 15. The viewing angle is therefore determined substantially by the thickness of the lower substrate. When the focal distance of the lens is small, that is, when the thickness of the lower substrate is small, the amount of light transmitted through the transmission opening section is increased. In this case, the viewing angle is large and the front luminance level of light propagating in the front direction is low. On the other hand, when the thickness of the lower substrate is large, the viewing angle is small and the front luminance level of light propagating in the front direction is high. In the present embodiment, a pair of lenticular lenses adjacent to each other is arranged to ensure that the centers of the pair of lenticular lenses are closer to each other than those of other lenticular lenses adjacent to the pair of lenticular lenses, in order to allow the lower substrate to have a large thickness, the front luminance level to be high, and the viewing angle to be large. The pair of the lenticular lenses with respective centers close to each other is called decentered lenticular lenses 2 in the present application. In this case, the transmission opening sections 15 are positioned to ensure that the positions of the centers of the transmission opening sections 15 coincide with the positions of the centers of the decentered lenticular lenses 2 in the Z direction (the front direction). Specifically, the transmission opening section 15 is provided in each of a plurality of pixels. The centers of the transmission opening sections 15 are shifted from the centers of the respective pixels. The transmission opening sections 15 present in two of the pixels, which are adjacent to each other, are arranged to ensure that the centers of the transmission opening sections 15 are closer to the boundary between the two pixels than the boundary between any one of the two pixels and another pixel adjacent to the one of the two pixels. The two pixels adjacent to each other are repeatedly arranged at a regular interval and in respective lines. In this case, the transmission opening sections 15 present in the two lines are arranged to ensure that the centers of the transmission opening sections 15 are closer to the boundary between the two lines than the boundary between any one of the two lines and another line adjacent to the one of the two lines.

Figure 27:
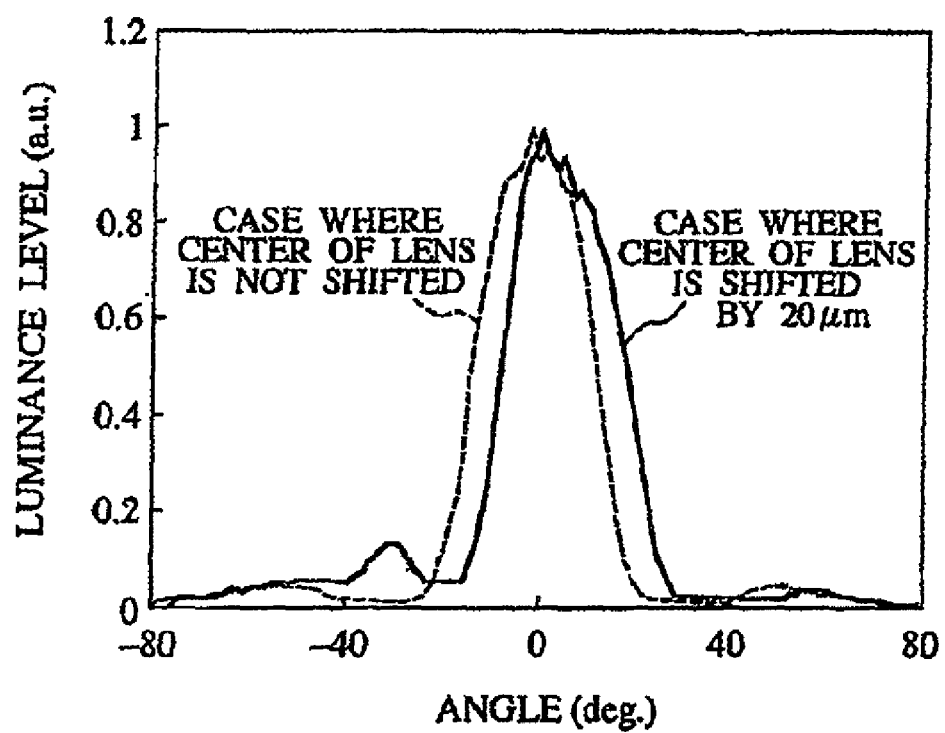
FIG. 27 is a graph showing a distribution of viewing angles of the image display element according to the tenth embodiment.

FIG. 27 is a graph showing the relationship between luminance levels and viewing angles in a direction in which the lenticular lenses focus light on the respective transmission opening sections 15 in the case there the centers of the lenticular lenses are not shifted from the centers of the respective pixels in the Z direction and case where the centers of the lenticular lenses are shifted from the centers of the respective pixels in the Z direction. FIG. 27 shows the case where a video graphics array (VGA) screen having a diagonal length of 2.4 inches (a pixel pitch of 76.5 μm) is used, the width and height of each of the transmission opening sections 15 are 16 μm and 29 μm, respectively. As apparent from FIG. 27, the viewing angle can be increased under the condition that the luminance level of light viewed from the front direction is not changed in the case where the decentered lenticular lenses 2 are used, compared with the case where the centers of the lenticular lenses are not shifted from the centers of the respective pixels in the Z direction.

When the decentered lenticular lenses 2 are used and an image is viewed from a direction oblique to the front direction, contrast of pixel lines constituting an image is different from each other. The resolution may be reduced to the half depending on the viewing angle in the worst case. When the image display element has a high resolution, the reduction in the resolution is not noticeable when an image is viewed from a direction oblique to the front direction. The decentered lenticular lenses 2 are effective especially when the image display element has a high resolution of 300 ppi (pixels per inch) or more.

Figure 28:
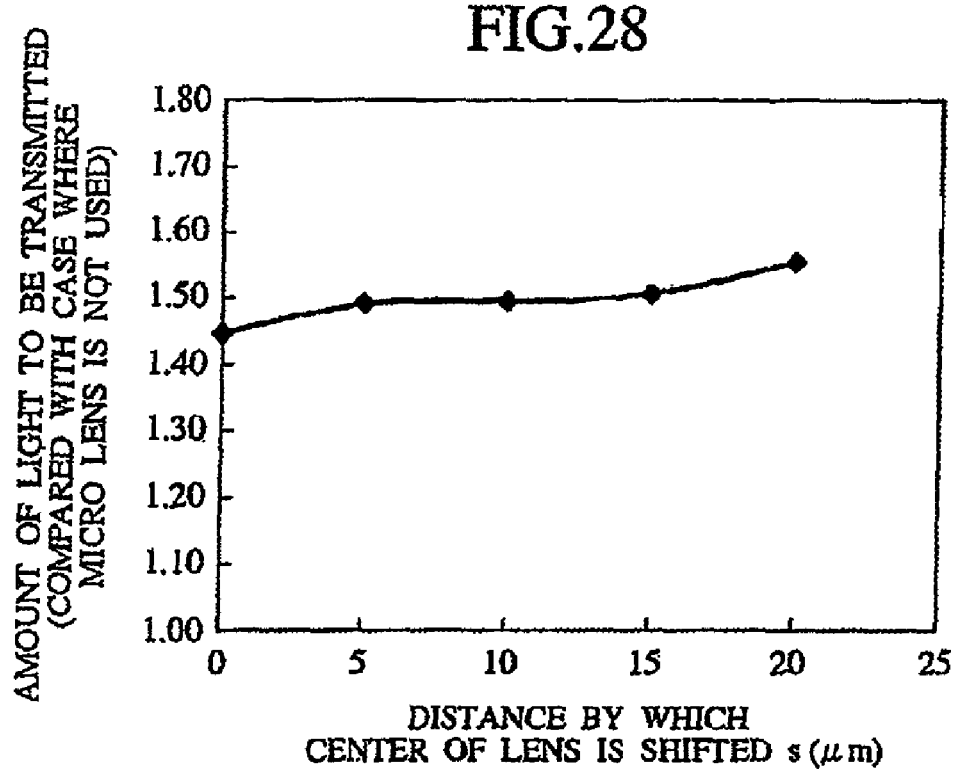
FIG. 28 is a graph showing the relationship between the amount of light transmitted through a transmission opening section according to the tenth embodiment and a distance by which the center of a lenticular lens is shifted.

FIG. 28 is a graph showing the relationship between the amount of light to be transmitted through the transmission opening section 15 and the distance s by which the center of the lenticular lens is shifted from the center of the pixel. In FIG. 28, when the lenticular lens is not used, the amount of light to be transmitted through the transmission opening section 15 indicates a value of 1 as a reference level. It is apparent from FIG. 28 that as the distance s by which the center of the lenticular lens is shifted is increased, the amount of light to be transmitted through the transmission opening section 15 is increased. Since the luminance level of light viewed from the front direction is not changed, it is considered that the amount of light propagating in a direction other than the front direction is increased. It is effective to shift the center of the lenticular lens from the center of the pixel when the total amount of light to be transmitted through the transmission opening section 15 is emphasized.

Figure 29:
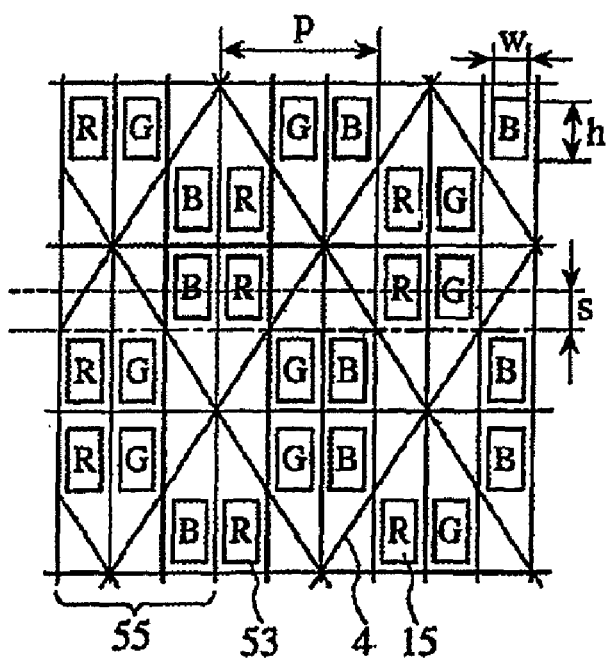
FIG. 29 is a front view of another arrangement of the pixels of the image display element according to the tenth embodiment.

FIG. 29 is a front view of the arrangement of pixels of the image display element when a decentered micro lens array 4 is used. The decentered micro lens array 4 includes lenses two-dimensionally arranged. When the decentered micro lens array 4 is used, the centers of the lenses of the decentered micro lens array 4 are shifted to ensure that four sub-pixels constituting a group are arranged closely to each other. The four sub-pixels constituting the group output light of two of three colors of red, green and blue (and have two types of color filters). In this arrangement, each pixel has three sub-pixels; at least one of the sub-pixels is located on one side of the pixel with respect to the direction in which the three sub-pixels are arranged; and the other one or two of the sub-pixels is or are located on the other side of pixel with respect to the direction in which the three sub-pixels are arranged. In this arrangement, the reduction in the resolution is not noticeable.

Figure 30:
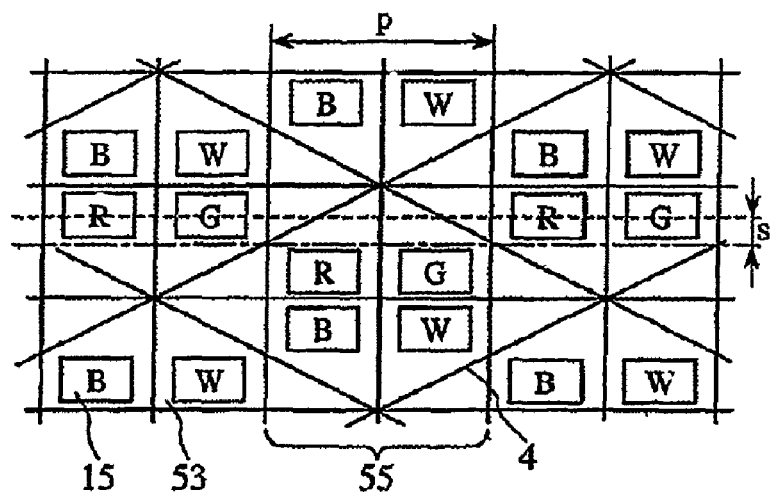
FIG. 30 is a front view of still another arrangement of the pixels of the image display element according to the tenth embodiment.

FIG. 30 is a front view of the arrangement of pixels of the image display element when the decentered micro lens array 4 is used. In the arrangement shown in FIG. 30, four types of sub-pixels are provided, which output light of respective colors of red, green, blue and white. In this arrangement, the centers of the lenses of the decentered micro lens array 4 are shifted to ensure that four sub-pixels of respective red, green, blue (which constitute a group) and white colors are arranged closely to each other and have respective four types of color filters.

Next, a description will be made of an eleventh embodiment of the present invention with reference to FIGS. 31 to 33.

Figure 31:
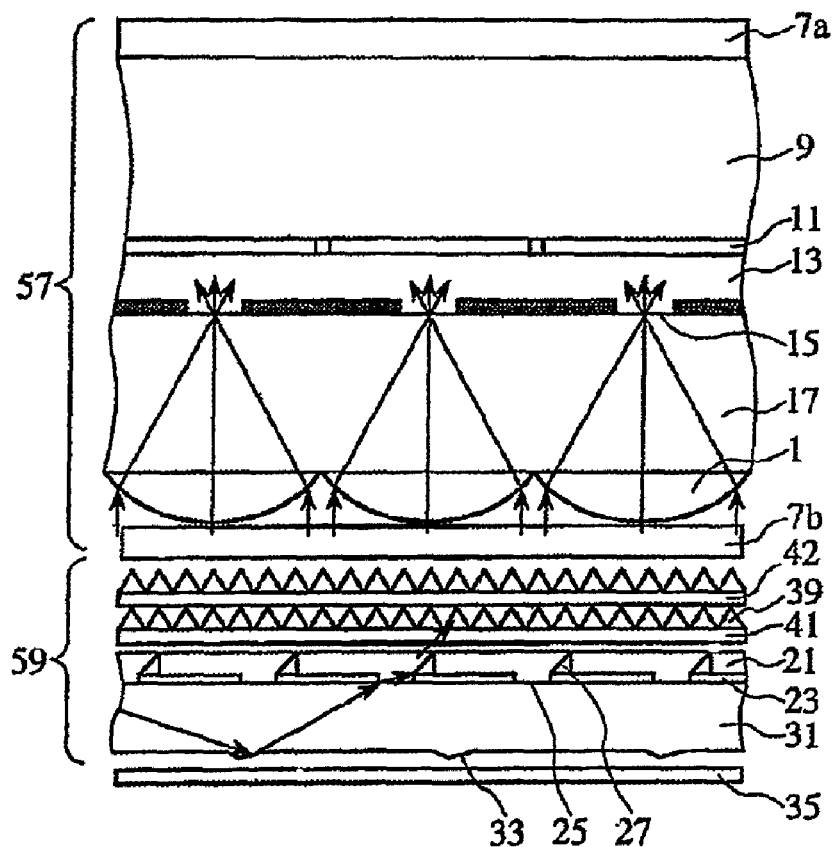
FIG. 31 is a cross sectional view of a planar light emitting element and an image display element according to an eleventh embodiment of the present invention.
Figure 32:
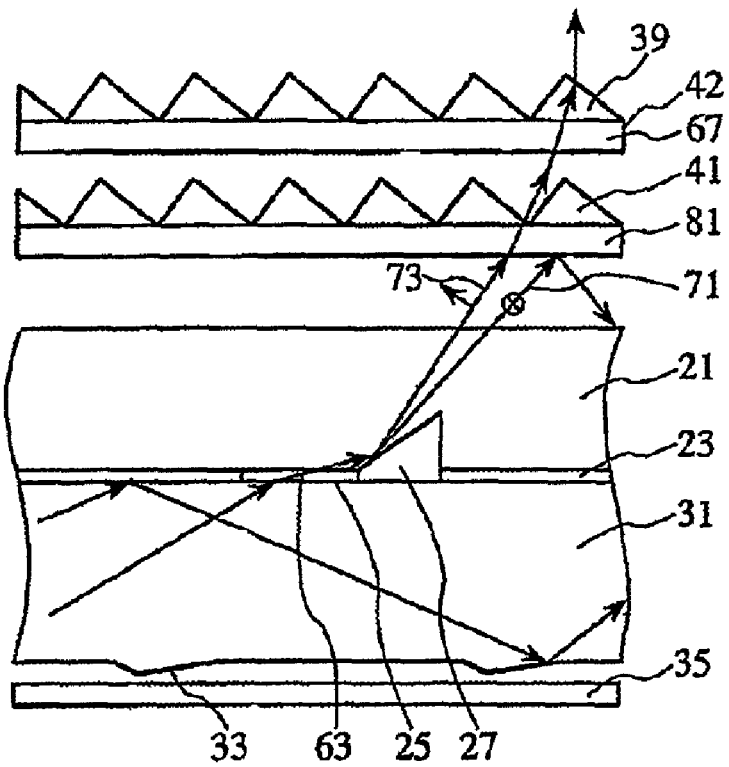
FIG. 32 is an enlarged cross sectional view of the planar light emitting element according to the eleventh embodiment.

FIG. 31 is a cross sectional view of a planar light emitting element and an image display element according to the eleventh embodiment. FIG. 32 is a cross sectional view of the planar light emitting element according to the eleventh embodiment. The image display element according to the eleventh embodiment is the same as the image display element according to the first embodiment. In the planar light emitting element according to the eleventh embodiment, the prism array provided in the first low refractive index layer 21 according to the second embodiment is separated from the first low refractive index layer 21; the prism sheet 41 is provided in place of the prism array; and a prism sheet 42 having a λ/2 plate 67 is provided. Other portions of the planar light emitting element according to the eleventh embodiment are the same as the planar light emitting element (backlight 59) according to the second embodiment. In other words, the plurality of prism layers according to the second embodiment are replaced with the prism sheet 41 and the prism sheet 42 having the λ/2 plate 67. The prism sheet 41 and the prism sheet 42 having the λ/2 plate 67 are sequentially laminated on the side of the light output surface of the first low refractive index layer 21.

In the arrangement shown in FIG. 31, light is totally reflected on the reflective mirror 27 having a hollow interior and output from the low refractive index layer 21 in a direction oblique to the front direction and nearly parallel to the light output surface of the light guide plate 31. The prism sheet 41 serves to improve the directivity of the light output from the low refractive index layer 21 in the direction oblique to the front direction, and directs the light to a direction close to the front direction. In order to improve the directivity of the light, the prism sheet 41 does not direct the light to the front direction, and the prism sheet 42 having the λ/2 plate 67 directs the light output from the prism sheet 41 to the front direction.

Figure 33:
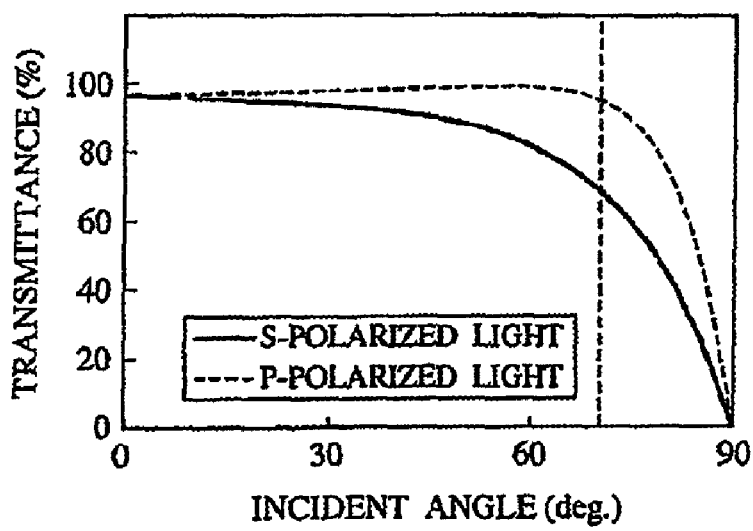
FIG. 33 is a graph showing the dependence of transmittance of a prism sheet according to the eleventh embodiment on an angle of the direction of light incident on the prism sheet.

FIG. 33 is a graph showing the dependence of transmittance of an incident surface of a base film 81 of the prism sheet 41 on an incident angle of light with respect to the incident surface of the base film 81. The first low refractive index layer 21 exhibits transmittance characteristics similar to those of the incident surface of the base film 81. In the present embodiment, light is incident on an incident surface of the first low refractive index layer 21 at a large angle with respect to the incident surface of the first low refractive index layer 21, and light is incident on an incident surface of the prism sheet 41 at a large angle with respect to the incident surface of the prism sheet 41. Therefore, P-polarized light components 73 are transmitted through the incident surface of the first low refractive index layer 21 at a higher rate than that of S-polarized light components 71. Also, P-polarized light components 73 are transmitted through the incident surface of the prism sheet 41 at a higher rate than that of S-polarized light components 71. Light to be transmitted through the prism sheet 41 contains a large amount of P-polarized components. In the present embodiment, the angle of the reflective surface of the reflective mirror 27 with respect to the light output surface of the light guide plate 31 is set to ensure that light incident on the prism sheet 41 at an incident angle of 70 degrees with respect to the incident surface of the prism sheet 41 has the highest intensity. The larger the angle of the direction of light incident on the prism sheet 41 with respect to the incident surface of the prism sheet 41, the larger the effect of improving the directivity by means of the prism sheet 41. As can be understood from FIG. 33, the degree of the polarization of light to be transmitted through the prism sheet 41 is increased as the angle of light incident on the prism sheet 41 with respect to the incident surface of the prism sheet 41 is increased. In order to increase the directivity and the degree of the polarization, the angle of the direction of light incident on the prism sheet 41 with respect to the incident surface of the prism sheet 41 is increased. It is desirable that the incident angle be 70 degrees or more. In order to increase the amount of light to be transmitted through the prism sheet 41, it is preferable that the prism sheet 41 have high transmittance, and the angle of light incident on the prism sheet 41 with respect to the incident surface of the prism sheet 41 be within a range from 65 degrees to 75 degrees.

There is a desirable polarization direction of light incident on the liquid crystal display element 57. When the polarization direction of light to be transmitted through the prism sheet 41 coincides with a polarization direction suitable for the liquid crystal display element 57, polarized light can be efficiently transmitted through the polarizing plate 7b. In the present embodiment, however, an in-plane switch (IPS) mode liquid crystal display element is used as the liquid crystal display element 57. Light to be incident on the liquid crystal display element 57 is preferably polarized in a substantially horizontal direction, which is different from the polarization direction of main components of light transmitted through the prism sheet 41.

The λ/2 plate is therefore provided to rotate the polarization direction by approximately 90 degrees. The prism sheet 42 is provided on the λ/2 plate and has a prism array. This configuration prevents an increase in the thickness of the image display device and allows the λ/2 plate 67, i.e., a retardation film to be inserted in the backlight 59 in order to obtain a desirable polarization direction.

The prism sheet 41 directs light toward a direction close to the front direction. After the light directed by the prism sheet 41 is transmitted through the prism sheet 42 provided with the λ/2 plate 67, the polarization state of the light is not almost changed. The λ/2 plate 67 may have an optical axis to obtain light in a desired polarization state. The λ/2 plate 67 is not limited to the base plate for the prism sheet 42. It is necessary that the λ/2 plate 67 is present between the liquid crystal display element 57 and the prism sheet 41. A medium having an optically isotropic property may be used as the base plate for the prism sheet 42 and located between the liquid crystal display element 57 and the prism sheet 41. The medium may be attached to the polarizing plate 7b.

Alternatively, light output from the first low refractive index layer 21 may be incident on the λ/2 plate 67 provided under the prism sheet 42 without using the prism sheet 41. In place of the λ/2 plate 67, a medium having birefringence and capable of canceling polarization may be provided to form a prism sheet.

The λ/2 plate 67 preferably provides a phase difference of a half of a wavelength within the visible light range, especially, a wavelength of 550 nm, which exhibits a high luminosity factor. It is, however, not necessary that the λ/2 plate 67 is provided. A retardation film capable of rotating the polarization direction may be replaced with the λ/2 plate 67. When the polarization direction of light to be transmitted through the prism sheet 41 coincides with the polarization direction suitable for the liquid crystal display element 57, the λ/2 plate 67 is not necessary. For example, when a circularly polarizing plate is used as the polarizing plate of the liquid crystal display element 57, the polarizing axis direction of the polarizing plate can coincide with the polarization direction of light output from the backlight, and the λ/2 plate 67 is not necessary.

The configuration of the planar light emitting element is not limited to the configuration described in the present embodiment. The planar light emitting element may have another configuration to obtain a similar effect in the case where light is output from the light output surface of the light guide plate toward a direction nearly parallel to the light output surface of the light guide plate, or in the case where light is incident on a flat optical sheet from a direction nearly parallel to an incident surface of the flat optical sheet, which is provided on the side of the light output surface of the light guide plate, has a prism shape on the side opposite to the light output surface and outputs light from a surface having the prism shape.

Figure 34:
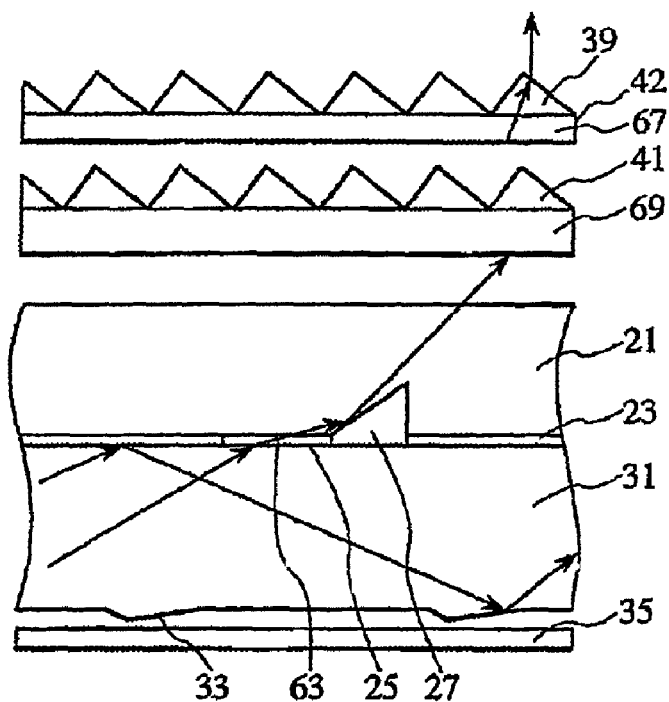
FIG. 34 is an enlarged cross sectional view of another planar light emitting element according to the eleventh embodiment.

FIG. 34 is a cross sectional view of another planar light emitting element according to the eleventh embodiment. In the planar light emitting element shown in FIG. 34, a reflective polarizing plate 69 is used as the base plate of the prism sheet 41. The reflective polarizing plate 69 is designed to reflect polarized light having a specific polarization direction and transmit polarized light having a polarization direction orthogonal to the specific polarization direction. In the planar light emitting element shown in FIG. 34, the reflective polarizing plate 69 is designed to reflect S-polarized light. Thus, light transmitted through the prism sheet 41 has a large amount of P-polarized light components and is linearly polarized. The λ/2 plate 67 is provided to rotate the polarization direction of the light output from the prism sheet 41.

Even if the reflective polarizing plate 69 is not used, S-polarized light is reflected on the incident surface of the prism sheet 41 at a high rate. Light output from the prism sheet 41 therefore contains polarized light components. The polarizing axis direction of the reflective polarizing plate 69 is adjusted to reflect S-polarized light at a high rate, return the S-polarized light to the side of the light guide plate 31, and reuse the S-polarized light. The backlight 59 therefore outputs linearly polarized light. The reflective polarizing plate 69 adjusts the polarization direction of the output light to ensure that the polarization direction is parallel to a transmission axis of the polarizing plate 7b. This increases the amount of light transmitted through the polarizing plate 7b.

Even when light is incident on the reflective polarizing plate 69 from a direction perpendicular to an incident surface of the reflective polarizing plate 69, the reflective polarizing plate 69 reflects polarized light having a specific polarization direction and transmit polarized light having a polarization direction orthogonal to the specific polarization direction.

In the present embodiment, light is output from the first low refractive index layer 21 toward a direction nearly parallel to the light output surface of the first low refractive index layer 21 and oblique to the light output surface of the first low refractive index layer 21 with high directivity. The reflective polarizing plate 69 may be replaced with a dielectric film having a refractive index different from that of the prism sheet 41 to allow S-polarized light to be reflected on the prism sheet 41 at a high rate and light having a large amount of P-polarized light components to be output from the prism sheet 41. In this case, it is preferable that light output from the first low refractive index layer 21 be incident on the incident surface of the prism sheet 41 at Brewster's angle.

In the present embodiment, since light is output from the first low refractive index layer 21 with high directivity in a direction oblique to the front direction oblique to the light output surface of the first low refractive index layer 21, the reflective polarizing plate 69 can efficiently function. The configuration of the backlight 59 is not limited to the configuration described in the present embodiment. As long as light is output from the light guide plate 31 toward a direction nearly parallel to the light output surface of the light guide plate 31 with high directivity, the backlight 59 may have another configuration to obtain a similar effect to that described above by means of the reflective polarizing plate and the λ/2 plate.

Figure 35:
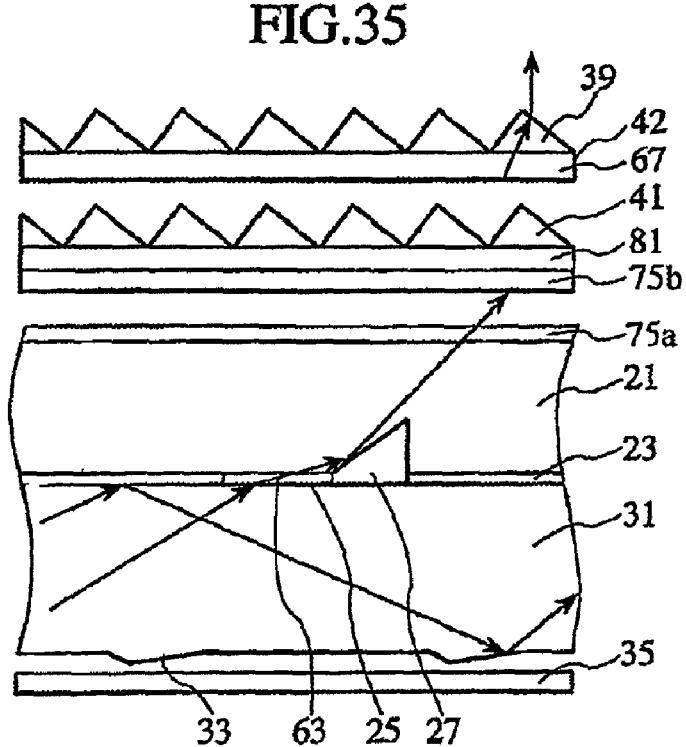
FIG. 35 is an enlarged cross sectional view of a planar light emitting element according to a twelfth embodiment of the present invention.

Next, a description will be made of a twelfth embodiment of the present invention with reference to FIGS. 35 and 36. FIG. 35 is a cross sectional view of a planar light emitting element according to the twelfth embodiment. The image display element to be used in the twelfth embodiment is the same as the image display element according to the first embodiment (which is used also in the eleventh embodiment). In the planar light emitting element according to the twelfth embodiment, the prism array provided in the first low refractive index layer 21 according to the second embodiment is separated from the first low refractive index layer 21; the prism sheet 41 is provided in place of the prism array; and the prism sheet 42 having the λ/2 plate 67 is provided. Other portions of the planar light emitting element according to the twelfth embodiment are the same as the planar light emitting element according to the second embodiment. In the twelfth embodiment, a high refractive index layer 75a is provided on the light output surface of the first low refractive index layer 21 and has a refractive index higher than those of the light guide plate 31 and the prism sheet 41, and a high refractive index layer 75b is provided (between the light guide plate 31 and the prism sheet 41) on the side of the light guide plate 31 with respect to the base film 81 of the prism sheet 41 and has a refractive index higher than those of the light guide plate 31 and the prism sheet 41. The planar light emitting element according to the twelfth embodiment is different from the planar light emitting element according to the eleventh embodiment in that the high refractive index layers 75a and 75b are provided.

Figure 36:
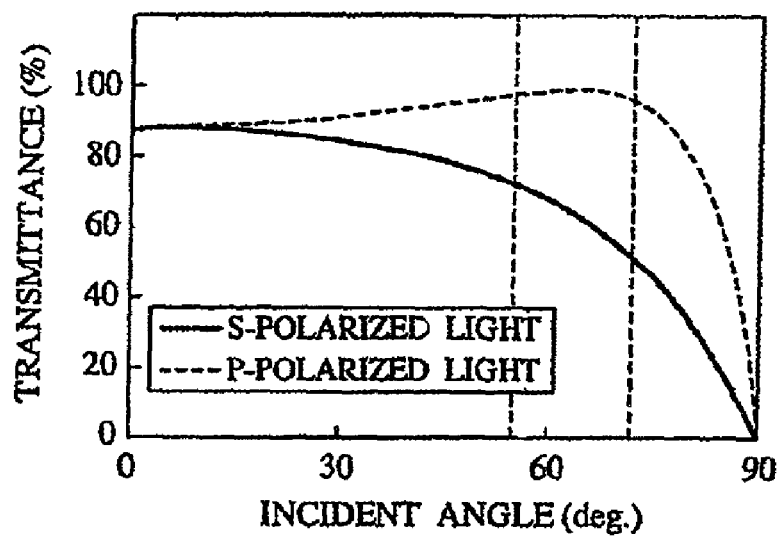
FIG. 36 is a graph showing the dependence of transmittance of a high refractive index layer according to the twelfth embodiment on an angle of the direction of light incident on the high refractive index layer.

FIG. 36 is a graph showing the dependence of transmittance of an incident surface of the high refractive index layer 75b on an angle of light incident on the incident surface of the high refractive index layer 75b with respect to a normal to the incident surface when the high refractive index layer 75b has a refractive index of 2.0. The high refractive index layer 75b has higher transmittance of P-polarized light than that of the reflective polarizing plate 69 shown in FIG. 34 (showing the case where the high refractive index layer 75b is not provided). Light transmitted through the high refractive index layer 75b contains a larger amount of P-polarized light components than that of P-polarized light components of light transmitted through the reflective polarizing plate 69 shown in FIG. 34. The high refractive index layer 75a is provided on the first low refractive index layer 21 to increase the degree of the polarization in the same manner. It is necessary that the high refractive index layers 75a and 75b have respective refractive indexes higher than those of the first low refractive index layer 21 and the base film 81. The higher the refractive indexes of the high refractive index layers 75a and 75b are, the larger the degree of the polarization is. It is therefore preferable that the high refractive index layers 75a and 75b have high refractive indexes, respectively. The high refractive index layers 75a and 75b preferably have respective refractive indexes of 1.8 or more. A thin film made of $TiO_2$, $Ta_2O_5$, $ZrO_2$, or ZnS is preferably used for the high refractive index layers 75a and 75b. Alternatively, a material formed by dispersing microscopic particles of a material having a high refractive index such as $TiO_2$, $Ta_2O_5$, $ZrO_2$, or ZnS into transparent polymer is preferably used for the high refractive index layers 75a and 75b. The high refractive index layers 75a and 75b preferably have respective thicknesses of 1 μm or more in order to prevent optical interference. When the liquid crystal display element 57 includes a micro lens array, an unnecessary color caused by optical interference due to the micro lens array is suppressed. Thus, when a micro lens array is provided in the liquid crystal display element 57, the high refractive index layers 75a and 75b may have respective thicknesses of 1 μm or less.

As described above in the second embodiment, the prism sheet 41 is adapted to improve the directivity of the light output from the first low refractive index layer 21 toward a direction nearly parallel to and oblique to the light output surface of the light guide plate 31 and direct the light toward a direction close to the front direction. In the present embodiment, the prism sheet 41 is not adapted to direct the light toward the front direction, and the prism sheet 42 having the λ/2 plate is adapted to refract the light toward the front direction.

In the present embodiment, the angle of the reflective surface of the reflective mirror 27 is set to ensure that light incident on the prism sheet 41 at an incident angle of 70 degrees with respect to the incident surface of the prism sheet 41 has the highest intensity. The larger the angle of the direction of light incident on the prism sheet 41 with respect to the incident surface of the prism sheet 41, the larger the effect of improving the directivity by means of the prism sheet 41. As can be understood from FIG. 36, the degree of the polarization of light to be transmitted through the prism sheet 41 is also increased as the angle of light incident on the prism sheet 41 with respect to the incident surface of the prism sheet 41 is increased. In order to increase the directivity and the degree of the polarization, the angle of the direction of light incident on the prism sheet 41 with respect to the incident surface of the prism sheet 41 is increased. It is desirable that the incident angle be 70 degrees or more. In order to increase the amount of light to be transmitted through the prism sheet 41, it is preferable that the prism sheet 41 have high transmittance, and the angle of light incident on the prism sheet 41 with respect to the incident surface of the prism sheet 41 be within a range from 65 degrees to 75 degrees.

In the present embodiment, the λ/2 plate is provided to rotate the polarization direction by approximately 90 degrees. The prism sheet 42 is provided on the λ/2 plate and has a prism array. This configuration prevents an increase in the thickness of the image display device and allows the λ/2 plate 67, i.e., a retardation film to be inserted in the backlight 59 in order to obtain a desirable polarization direction.

In the present embodiment, polarized light having high directivity can be obtained from the backlight by means of the high refractive index layers 75a and 75b. When the base film 81 of the prism sheet 41 has a high refractive index to obtain a desired degree of polarization, the high refractive index layer 75b is not necessary. Both the high refractive index layers 75a and 75b are not necessarily required. Either the high refractive index layers 75a or 75b may be removed.

Figure 37:
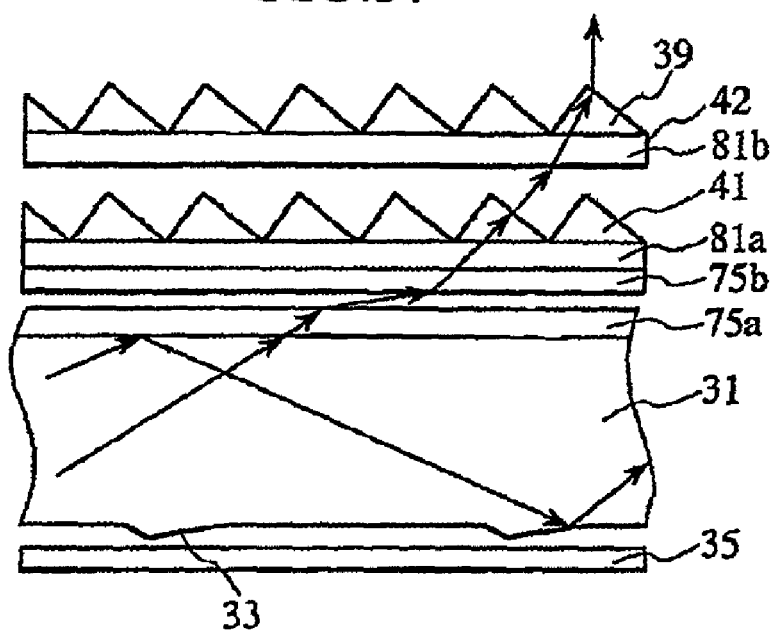
FIG. 37 is an enlarged cross sectional view of another planar light emitting element according to the twelfth embodiment.

FIG. 37 is a cross sectional view of another planar light emitting element according to the twelfth embodiment. The planar light emitting element shown in FIG. 37 is different from the planar light emitting element shown in FIG. 35 in the structure of the light guide plate 31.

Light incident on the light guide plate 31 from a light source is repeatedly reflected and propagates in the light guide plate 31 and the high refractive index layer 75a provided on the light guide plate 31. The reflective groove 33 is provided in the light guide plate 31 and on the side opposite to the light output surface of the light guide plate 31. The reflective sheet 35 is provided on the side opposite to the light output surface of the light guide plate 31 with respect to the reflective groove 33. The light propagates in the light guide plate 31 at a certain angle with respect to the light output surface of the light guide plate 31, and is reflected on the reflective groove 33 and propagates at a larger angle with respect to the light output surface of the light guide plate 31 than the certain angle. When the light propagates at a larger angle with respect to the light output surface of the light guide plate 31 than an angle at which light is totally reflected on the interface between the high refractive index layer 75a and an atmosphere of air, the light is output from the light guide plate 31 to the side of the prism sheet 41. In this case, since the light is output from the high refractive index layer 75a toward a direction nearly parallel to the light output surface of the light guide plate 31, the output light is polarized due to the difference between the transmittance of the atmosphere of air and the transmittance of the high refractive index layer 75a and further strongly polarized by the high refractive index layer 75b before the light is incident on the prism sheet 41. The polarization direction of the polarized light is rotated by the λ/2 plate (provided under the prism sheet 42) to a desired polarization direction, which is suitable for the liquid crystal display element.

The structure of the light guide plate 31 provided in the planar light emitting element is not limited to the abovementioned structure. The light guide plate 31 may have another structure capable of outputting light having a high degree of polarization as long as light is output from the light guide plate 31 toward a direction nearly parallel to the light output surface of the light guide plate 31 and has high directivity.

Figure 38:
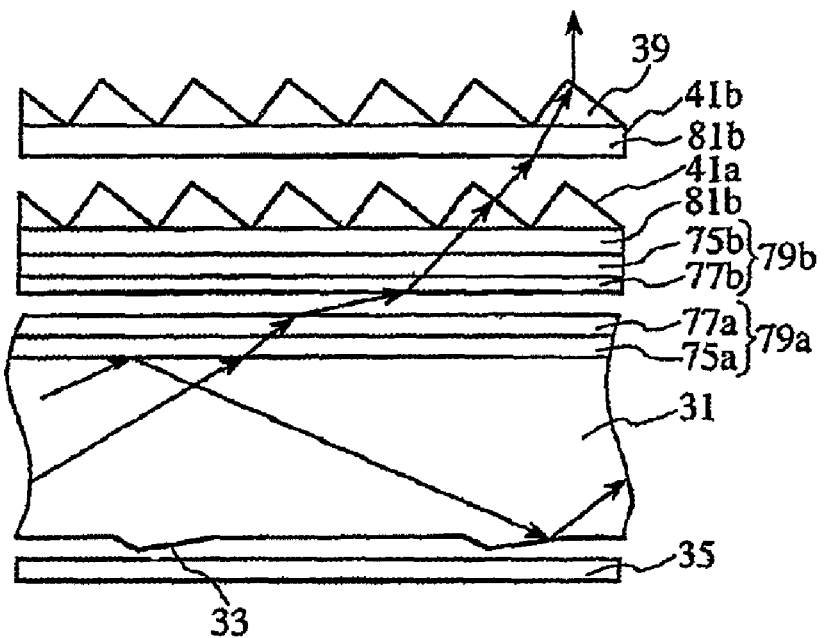
FIG. 38 is an enlarged cross sectional view of a planar light emitting element according to a thirteenth embodiment of the present invention.

Next, a description will be made of a thirteenth embodiment of the present invention with reference to FIGS. 38 and 39. FIG. 38 is a cross sectional view of a planar light emitting element according to the thirteenth embodiment. In the planar light emitting element, a depolarized light transmission film 79 is provided in place of the high refractive index layers. Other portions of the planar light emitting element according to the thirteenth embodiment are the same as those of the planar light emitting element shown in FIG. 37.

In the present embodiment, the depolarized light transmission film 79 is formed by laminating a high refractive index layer 75 and a low refractive index layer 77 in this order on the base film 81a. The high refractive index layer 75 has a refractive index of 1.8 and a thickness of 55 nm. The low refractive index layer 77 has a refractive index of 1.22 and a thickness of 176 nm. In the case where the planar light emitting element according to the present embodiment has a configuration shown in FIG. 38, the depolarized light transmission film 79 includes depolarized light transmission films 79a and 79b. The light guide plate 31 and the base film 81a of the prism sheet 41a have a refractive index of 1.5. The depolarized light transmission film 79a is provided on the side of the light output surface of the light guide plate 31 with respect to the depolarized light transmission film 79b. The depolarized light transmission film 79b is provided on the side of light guide plate 31 with respect to the prism sheet 41a. The depolarized light transmission films 79a and 79b have the same configuration.

Figure 39:
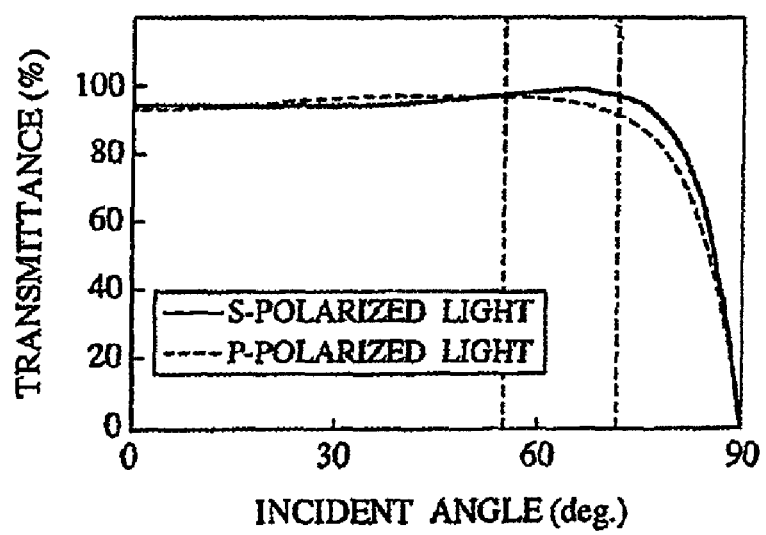
FIG. 39 is a graph showing the dependence of transmittance of a depolarized light transmission layer according to the thirteenth embodiment on an incident angle of light.

FIG. 39 is a graph showing the dependence of transmittance of the depolarized light transmission film 79 for light having a wavelength of 550 nm on an incident angle of the light. The depolarized light transmission film 79 has transmittance of P-polarized light and transmittance of S-polarized light, which are substantially the same as each other. When the incident angle is large, the depolarized light transmission film 79 has transmittance of S-polarized light, which is slightly higher than the transmittance of P-polarized light. In the present embodiment, when the light is incident on the prism sheet 41a at an angle of about 70 degrees with respect to an incident surface of the prism sheet 41a, the light has the highest intensity. Thus, the light transmitted through the prism sheet 41a has a slightly larger amount of S-polarized light components than that of P-polarized light components. According to the graph shown in FIG. 39, it is preferable that light be incident on the prism sheet 41 at an angle of 55 degrees or more with respect to the incident surface of the prism sheet 41 in order to efficiently output S-polarized light from the prism sheet 41. Light is output from the light guide plate 31 at an angle ranging from 60 degrees to 80 degrees with respect to the light output surface of the light guide plate 31. When light is output from the light guide plate 31 at an angle of approximately 70 degrees with respect to the light output surface of the light guide plate 31, the light has a high intensity. According to the graph shown in FIG. 39, when the incident angle is 70 degrees, the transmittance of S-polarized light is 98% and the transmittance of P-polarized light is 92%. A depolarized light transmission layer (the depolarized light transmission film 79) transmits at least 90% of S-polarized light components and at least 90% of P-polarized light components. In this case, the S-polarized light components and P-polarized light components are contained in light incident on the depolarized light transmission layer at an angle of 70 degrees (at which light having a wavelength within the visible light range and a high intensity is output from the light guide plate) with respect to the incident surface of the depolarized light transmission layer from the light guide plate 31. The depolarized light transmission layer makes it possible to efficiently obtain the light. The light transmitted through the prism sheet 41a is directed by a prism sheet 41b toward the front direction while the polarization direction of the light is not changed.

The high refractive index layer 75b and the low refractive index layer 77b are sequentially laminated on the base film 81a. The high refractive index layer 75b has a refractive index higher than the base film 81a, and the low refractive index layer 77b has a refractive index lower than the base film 81a. In this arrangement, light incident on the refractive index layer 77b from a direction oblique to a normal to an incident surface of the low refractive index layer 77b is transmitted through the low refractive index layer 77b and the high refractive index layer 75b while the polarization direction of the light is not almost changed. The high refractive index layers 75a and 75b preferably have respective thicknesses smaller than those of the low refractive index layers 77a and 77b. The high refractive index layers 75a and 75b may be made of TiO$_2$, Ta$_2$O$_5$, ZrO$_2$, or ZnS. Alternatively, the high refractive index-layers 75a and 75b may be made of an inorganic film containing a material formed by mixing an inorganic material having a low refractive index and a material such as TiO$_2$, Ta$_2$O$_5$, ZrO$_2$ or ZnS. In addition, the high refractive index layers 75a and 75b may be made of a material by mixing polymer and microscopic particles of a dielectric material having a high refractive index. The low refractive index layers 77a and 77b may be made of a dielectric material having a low refractive index such as MgO, or made of a base material (such as silica) having a nanometer-scale hole (sufficiently smaller than a wavelength of light). When the base material having a nanometer-scale hole is used, the refractive indexes of the low refractive index layers 77a and 77b are 1.3 or lower. Such a nanometer-scale structural material can be formed by heating a coated film made of a coating material (in which silica particles are dispersed into a solvent) and forming a microscopic hole in the coated film.

The planar light emitting element according to the present embodiment has a two-layer structure with the depolarized light transmission films 79a and 79b. The planar light emitting element may have a multi-layer structure with three or more depolarized light transmission films. In addition, the planar light emitting element is not limited to a multi-layer structure and may have a periodical structure (nanometer-scale structure) finer than a wavelength of light. In the nanometer-scale structure, the difference between transmittance values of polarized light components is small. The nanometer-scale structure is the same type as that of a non-reflective structure. The nanometer-scale structure suppresses reflection of light and exhibits high transmittance. Also, the nanometer-scale structure reduces the degree of dependence of the transmittance on the wavelength of light to be transmitted and increases transmittance of all wavelengths of visible light.

When the planar light emitting element has a multi-layer structure as described in the present embodiment, the transmittance of the depolarized light transmission films 79a and 79b may be dependent on the wavelength of light to be transmitted. This results in the fact that a color of an image may be changed depending on the angle at which the image is viewed. When a micro lens array is used in the liquid crystal display element, the micro lens array suppresses the dependence on the wavelength of light thereby suppressing an unnecessary color. As described in the present embodiment, the liquid crystal display element is preferably provided with the micro lens array.

In the present embodiment, it is not necessary to rotate the polarization direction of light. The prism array 39 is provided on a base film 81*b* having no phase difference from that of the prism array 39.

In the planar light emitting elements according to the eleventh to thirteenth embodiments of the present invention, the structures capable of controlling the degree of polarization and the polarization direction are provided. The planar light emitting elements according to the eleventh to thirteenth embodiments are not limited to the abovementioned structures. There is a tendency that a typical planar light emitting element having high directivity easily polarizes light. The structure for controlling the polarization according to the present invention is applicable to a typical planar light emitting element depending on the structure of the typical planar light emitting element. The liquid crystal display element to be combined with any one of the planar light emitting elements according to the eleventh to thirteenth embodiments is not limited. The liquid crystal display element having no micro lens is applicable to any one of the planar light emitting elements according to the eleventh to thirteenth embodiments.

In the abovementioned embodiments, the LED is used as the light source. A linear light source such as a cold cathode fluorescent lamp may be used as the light source. When the LED is used, the number of the LEDs is not limited.

The in-plane switch (IPS) mode liquid crystal display element is used as the liquid crystal display element 57 in the thirteenth embodiment. A vertical alignment mode liquid crystal display element or the like may be used as the liquid crystal display element 57.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A planar light emitting element comprising:
 a light source;
 a light guide body for transmitting light emitted by the light source;
 first and second refractive index layers provided on the side of a light output surface of the light guide body; and
 a reflective plate for reflecting light output from the light guide body through an opening section;
 wherein the opening section is provided in the second refractive index layer, the second refractive index layer being arranged between the light guide body and the first refractive index layer, the opening section extending through the second refractive index layer; and
 the following expressions are established:

$n_1 > n_2 > n_3$; and $n_1 - n_2 > n_2 - n_3$, where $n_1$ is a refractive index of the light guide body, $n_2$ is a refractive index of the first refractive index layer, and $n_3$ is a refractive index of the second refractive index layer.

2. The planar light emitting element according to claim 1, wherein
 the light reflected on the reflective plate is output from the first refractive index layer.

3. The planar light emitting element according to claim 1, wherein
 the reflective plate is a reflective mirror, and
 the reflective mirror has a reflective film formed thereon.

4. The planar light emitting element according to claim 1, wherein
 the reflective plate is provided on the second refractive index layer and on the side of a light output surface of the second refractive index layer.

5. The planar light emitting element according to claim 1, wherein
 the light guide body has a reflective groove on the side opposite to the light output surface of the light guide body.

6. The planar light emitting element according to claim 1, wherein
 the opening section and the reflective plate are randomly arranged on the light guide body.

7. The planar light emitting element according to claim 1, wherein
 the opening section and the reflective plate are repeatedly arranged at a regular interval.

8. The planar light emitting element according to claim 1, wherein
 the reflective plate has a curved portion with a radius of curvature to ensure that the center of the radius of curvature is located in the opening section.

9. The planar light emitting element according to claim 1, wherein
 a plurality of prism layers is provided on the side of a light output surface of the first refractive index layer.

10. The planar light emitting element according to claim 9, wherein
 the plurality of prism layers includes a prism array and a prism sheet, and
 the prism array and the prism sheet are sequentially stacked on the side of the light output surface of the first refractive index layer.

11. The planar light emitting element according to claim 10, wherein
 the prism array includes a prism having a tip portion, and an apex angle of the tip portion of the prism is 90 degrees.

12. The planar light emitting element according to claim 9, wherein
 the plurality of prism layers includes a prism sheet and a λ/2 plate, and
 the prism sheet and the λ/2 plate are sequentially stacked on the side of the light output surface of the first refractive index layer.

13. The planar light emitting element according to claim 9, wherein
 a transparent adhesion layer is provided in the opening section.

14. The planar light emitting element according to claim wherein
 a reflective film is provided on the second refractive index layer and adapted to reflect light propagating from the side of a light output surface of the first refractive index layer and incident thereon.

15. An image display device comprising:
 the planar light emitting element according to claim 1;
 a pair of substrates;
 a pair of polarizing plates sandwiching the substrates;

a liquid crystal layer provided between the substrates; and
light focusing elements provided on the side opposite to the liquid crystal layer with respect to the one of the substrates and between the one of the substrate and one of the polarizing plates;
wherein the light focusing elements focuses light on respective transmission opening sections,
the transmission opening sections are provided between the one of the substrates and the liquid crystal layer and in respective pixels,
the centers of the transmission opening sections are shifted from the centers of the respective pixels,
each transmission opening section provided in two of the pixels, which are adjacent to each other, is arranged to ensure that the centers of the transmission opening sections are closer to the boundary between the two pixels than the boundary between a pixel adjacent to any one of the two pixels and the one of the two pixels, and
the two pixels adjacent to each other are repeatedly arranged at a regular interval.

16. The image display device according to claim 15, wherein
the light focus elements are lenticular lenses, and
the two pixels adjacent to each other and repeatedly arranged at a regular interval are provided in respective lines, and the transmission opening sections present in the two lines are arranged to ensure that the centers of the transmission opening sections are closer to the boundary between the two lines than the boundary between another line adjacent to any one of the two lines and the one of the two lines.

17. The image display device according to claim 16, wherein
the two pixels includes two types of color filters.

18. The image display device according to claim 15, wherein
four pixels selected from the pixels and adjacent to each other constitute a group, and four of the transmission opening sections, which are present in each group, are arranged to ensure that the centers of the four transmission opening sections are closer to each other than the center of one of the transmission opening sections excluding the four transmission opening sections.

19. The image display device according to claim 18, wherein
the four pixels includes four types of color filters.

20. The image display device according to claim 15, wherein
the light focus elements are asymmetric lenticular lenses.

21. The planar light emitting element according to claim 1, wherein the refractive index of the second refractive index layer is no greater than 1.34.

22. The planar light emitting element according to claim 1, wherein the refractive index of the first refractive index layer and the refractive index of the second refractive index layer are no greater than 1.3.

23. A planar light emitting element comprising:
a light source;
a light guide body for transmitting light emitted by the light source;
a prism sheet having a flat surface on the side of the light guide body; and
a depolarized light transmission layer provided between the light guide body and the prism sheet and adapted to transmit at least 90% of S-polarized light components and at least 90% of P-polarized light components, the S-polarized light components and the P-polarized light components being contained in light having at least one wavelength within the visible light range and incident on the depolarized light transmission layer at an angle of 70 degrees with respect to an incident surface of the depolarized light transmission layer.

24. The planar light emitting element according to claim 23, wherein
the depolarized light transmission layer includes a high refractive index layer and a low refractive index layer, the high refractive index layer being provided on a base plate and having a refractive index higher than that of the base plate, and the low refractive index layer being provided on the high refractive index layer and having a refractive index lower than that of the base plate.

25. An image display device comprising:
an image display element for displaying an image; and
a planar light emitting element having a light source and adapted to illuminate the image display element with light emitted by the light source;
wherein the planar light emitting element includes:
a light guide body for transmitting light emitted by the light source;
first and second refractive index layers laminated on the side of a light output surface of the light guide body; and
a reflective plate for reflecting light output from the light guide body through an opening section;
the opening section is provided in the second refractive index layer present between the light guide body and the first refractive index layer;
the image display element includes:
a pair of substrates; and
a light focusing element provided between one of the substrates and the planar light emitting element and adapted to focus light output from the planar light emitting element on a transmission opening section provided between the substrates and in a pixel.

26. The image display device according to claim 25, wherein the following expressions are established:

$$n_1 > n_2 > n_3; \text{ and}$$

$$n_1 - n_2 > n_2 - n_3,$$

where $n_1$ is a refractive index of the light guide body, $n_2$ is a refractive index of the first refractive index layer, and $n_3$ is a refractive index of the second refractive index layer.

27. The image display device according to claim 25, wherein
the planar light emitting element and the image display element are in contact with each other.

28. The image display device according to claim 25, wherein
the image display element is a liquid crystal display element having a liquid crystal layer and a pair of polarizing plates, the liquid crystal layer being provided between the substrates, the pair of polarizing plates being provided on the side opposite to the liquid crystal layer with respect to the substrates.

29. The image display device according to claim 28, wherein
the image display element is an in-plane switch mode liquid crystal display element.

30. The image display device according to claim 28, wherein
the image display element is a vertical alignment mode liquid crystal display element.

31. An image display device comprising:

an image display element for displaying an image; and a planar light emitting element having a light source and adapted to illuminate the image display element with light emitted by the light source;

wherein the image display element includes:

a pair of substrates;

a liquid crystal layer provided between the substrates; and a light focusing element for focusing light output from the planar light emitting element on a transmission opening section provided in a pixel; and the planar light emitting element includes:

a light guide body for transmitting light emitted by the light source;

a prism sheet having a flat surface provided on the side of the light guide body; and a depolarized light transmission layer provided between the light guide body and the prism sheet and adapted to transmit at least 90% of S-polarized light components and at least 90% of P-polarized light components, the S-polarized light components and the P-polarized light components being contained in light having at least one wavelength within the visible light range and incident on the depolarized light transmission layer at an angle of 70 degrees with respect to an incident surface of the depolarized light transmission layer.

* * * * *